(12) United States Patent
Moon et al.

(10) Patent No.: US 12,276,151 B2
(45) Date of Patent: Apr. 15, 2025

(54) DAMPER FOR GLOVE BOX AND GLOVE BOX HAVING THE SAME

(71) Applicants: HYUNDAI MOBIS CO., LTD., Seoul (KR); PIOLAX CO., LTD., Incheon (KR)

(72) Inventors: Yong Gon Moon, Yongin-si (KR); Hak Young Kim, Yongin-si (KR); Kyung Joo Song, Incheon (KR)

(73) Assignees: Hyundai Mobis Co., Ltd., Seoul (KR); PIOLAX CO., LTD., Incheon (KR)

( * ) Notice: Subject to any disclaimer, the term of this patent is extended or adjusted under 35 U.S.C. 154(b) by 420 days.

(21) Appl. No.: 17/863,609

(22) Filed: Jul. 13, 2022

(65) Prior Publication Data

US 2023/0279709 A1 Sep. 7, 2023

(30) Foreign Application Priority Data

Mar. 2, 2022 (KR) .................. 10-2022-0026700

(51) Int. Cl.
*B60R 7/06* (2006.01)
*E05F 3/02* (2006.01)
(Continued)

(52) U.S. Cl.
CPC .............. *E05F 3/02* (2013.01); *B60R 7/06* (2013.01); *E05Y 2201/21* (2013.01); *E05Y 2900/538* (2013.01); *F16F 9/342* (2013.01)

(58) Field of Classification Search
CPC .......... E05F 3/02; E05F 5/02; E05Y 2201/21; E05Y 2201/234; E05Y 2201/25;
(Continued)

(56) References Cited

U.S. PATENT DOCUMENTS

2003/0141638 A1* 7/2003 Salice ............... F16F 9/0209
 267/71
2009/0090587 A1* 4/2009 Tomita ............... F16F 9/3228
 188/282.6
(Continued)

FOREIGN PATENT DOCUMENTS

| JP | 5-58996 U | 8/1993 |
| JP | 2011-69424 A | 4/2011 |
| KR | 10-2008-0089187 A | 10/2008 |

OTHER PUBLICATIONS

Korean Office Action issued on Jun. 21, 2024, in counterpart Korean Patent Application No. 10-2022-0026700 (5 pages in English, 5 pages in Korean).
(Continued)

*Primary Examiner* — Gregory A Blankenship
(74) *Attorney, Agent, or Firm* — NSIP Law

(57) ABSTRACT

A damper for a glove box including a cylinder including a cylinder body that defines a space therein, a partition that divides the space into a first space and a second space, and a first protruding portion protruding from the partition so that a hole formed in the partition is extended; a piston disposed in the first space to be movable in a first direction; a valve disposed in the second space; and an elastic support unit disposed in the second space to elastically support the valve. The elastic support unit is in contact with and pressed by the partition due to movement of the piston.

20 Claims, 35 Drawing Sheets

(51) Int. Cl.
 *F16F 9/34* (2006.01)
 *F16F 9/342* (2006.01)
(58) Field of Classification Search
 CPC ......... E05Y 2201/256; E05Y 2201/264; E05Y 2201/412; E05Y 2900/538; F16F 9/446; F16F 9/342; F16F 9/0218; F16F 9/34; F16F 9/512; F16F 13/007; B60R 7/06; B60R 2011/0005
 USPC ..................................................... 296/37.12
 See application file for complete search history.

(56) References Cited

U.S. PATENT DOCUMENTS

| 2010/0162522 | A1* | 7/2010 | Han | B60R 7/06 |
| | | | | 16/70 |
| 2011/0127129 | A1* | 6/2011 | Okabayashi | F16F 9/3415 |
| | | | | 188/282.1 |
| 2016/0137137 | A1* | 5/2016 | Shibata | B60R 7/06 |
| | | | | 296/37.12 |
| 2017/0009837 | A1* | 1/2017 | Saito | F16F 9/5165 |
| 2017/0284141 | A1* | 10/2017 | Roychoudhury | F16F 9/0481 |
| 2020/0408270 | A1* | 12/2020 | Kato | F16F 7/09 |
| 2021/0062564 | A1* | 3/2021 | Kato | F16F 9/516 |
| 2023/0279709 | A1* | 9/2023 | Moon | F16F 9/3235 |
| | | | | 296/37.12 |
| 2023/0279920 | A1* | 9/2023 | Kotani | F16F 9/3482 |
| | | | | 188/269 |
| 2023/0304341 | A1* | 9/2023 | Moon | F16F 9/446 |
| 2023/0311778 | A1* | 10/2023 | Moon | E05F 5/10 |
| | | | | 296/37.12 |

OTHER PUBLICATIONS

Korean Office Action issued on Sep. 26, 2023, in counterpart Korean Patent Application No. 10-2022-0026700 (4 pages in Korean).

* cited by examiner

DAMPER FOR GLOVE BOX AND GLOVE BOX HAVING THE SAME

CROSS-REFERENCE TO RELATED APPLICATION

This application claims priority to and the benefit of Korean Patent Application No. 2022-0026700, filed on Mar. 2, 2022, the disclosure of which is incorporated herein by reference in its entirety.

BACKGROUND

1. Field of the Invention

The present invention relates to a damper for a glove box used in a vehicle and a glove box including the same. Specifically, the present invention relates to a damper for a glove box which controls opening and closing speeds of a glove box and a glove box including the same.

2. Discussion of Related Art

Generally, a glove box for accommodating simple objects is disposed in a dashboard or instrument panel of a vehicle. In this case, the glove box is generally disposed in front of a passenger's seat.

A cover opens or closes an inner space of the glove box to accommodate objects therein. A damper is installed to prevent sudden movement of the cover when the inner space is opened or closed.

The damper includes a cylinder and a piston, and as necessary, a valve can be installed at one side of the cylinder in order to control a speed of the piston.

However, when a load applied to the cover of the glove box increases due to a weight of objects loaded therein or a weight of the cover, the conventional damper has a problem that an opening speed of the glove box cannot be controlled.

Accordingly, a glove box providing a constant feeling of speed of opening a cover even with a change in load is required.

SUMMARY OF THE INVENTION

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

The present invention is directed to providing a damper for a glove box capable of moving a cover of a glove box at a constant speed within a predetermined range regardless of a load applied to the glove box.

Objectives to be solved by the present invention are not limited to the above-described objectives, and other objectives, which are not described above, will be clearly understood by those skilled in the art from the following description.

In one general aspect, a damper for a glove box includes: a cylinder including a cylinder body that defines a space therein, a partition that divides the space into a first space and a second space, and a first protruding portion protruding from the partition so that a hole formed in the partition is extended, a piston disposed in the first space and configured to be movable in a first direction, a valve disposed in the second space, and an elastic support unit disposed in the second space to elastically support the valve. The elastic support unit is in contact with and pressed by the partition due to movement of the piston.

The valve may include a valve body having a plate shape, a second protruding portion protruding from the valve body so that an end portion of the first protruding portion is disposed in the second protruding portion, and a leg protruding from the valve body. The leg may be the elastic support unit, and the valve body and the leg may be integral.

The leg may include a plurality of legs, and the legs may be rotationally symmetrical with respect a center of the valve body.

The leg may be disposed on one surface of the valve body and inclined at a predetermined angle.

The leg may be bar-shaped.

The leg may include a first region obliquely disposed on the valve body and a second region obliquely disposed from an end portion of the first region, and the second region may overlap the first region in the first direction.

An end portion of the second region may be formed to have a curved surface, and the curved surface may be in contact with the partition.

The leg may be arc-shaped.

The leg may be tapered-shaped and may have a cross section having a ring shape.

Based on the one surface of the valve body, a length of the leg in the first direction may be greater than a length of the second protruding portion in the first direction.

The valve may include a valve body having a plate shape and a second protruding portion protruding from the valve body so that an end portion of the first protruding portion is disposed in the second protruding portion, and the elastic support unit may include a coil spring having one side in contact with the valve body and another side in contact with the partition.

The partition may include a first plate portion, a second plate portion disposed apart from the first plate portion in the first direction, and a connection part connecting the first plate portion to the second plate portion. The hole may be disposed in the second plate portion, and the one side of the spring may be in contact with the second plate portion.

An orifice may be disposed between an outer surface of the first protruding portion and an inner surface of the second protruding portion, and a size of the orifice may change according to movement of the second protruding portion.

The outer surface of the first protruding portion may be an inclined surface having a predetermined inclination.

In addition, the first protruding portion may be formed in a shape of which a cross-sectional area decreases toward an end portion thereof.

The valve may include a protrusion protruding from an outer surface of the valve body, the cylinder body may include a first guide hole and a second guide hole having different sizes in the first direction, and the protrusion may be disposed in one of the first guide hole and the second guide hole.

A size of the second guide hole in the first direction may be greater than a size of the first guide hole in the first direction, and a separation distance from the partition to the first guide hole may be equal to a separation distance from the partition to the second guide hole.

The cylinder body may include a third guide hole, a size of the third guide hole in the first direction may be greater than a size of the second guide hole in the first direction, and a separation distance from the partition to the third guide hole may be equal to the separation distance from the partition to the second guide hole.

The cylinder body may include a plurality of guide holes having different sizes in the first direction, the valve may further include a protrusion protruding from the outer surface of the valve body, the protrusion may be disposed in any one of the plurality of guide holes, and a depth to which the first protruding portion is inserted into the second protruding portion may be restricted due to a position of the guide hole and a size of the guide hole in the first direction.

In another general aspect, a damper for a glove box includes a cylinder including a cylinder body that defines a space therein, a partition that divides the space into a first space and a second space, a first protruding portion protruding from the partition so that a hole formed in the partition is extended, and a plurality of guide holes disposed in the cylinder body to expose the second space, a piston formed in the first space and configured to be movable in a first direction, and a valve disposed in the second space, wherein the valve includes a valve body having a plate shape, a second protruding portion protruding from the valve body so that an end portion of the first protruding portion is disposed in the second protruding portion, a leg protruding from the valve body toward the partition, and a protrusion protruding from an outer surface of the valve body, the guide hole includes a first guide hole and a second guide hole having different sizes in the first direction, and the protrusion is disposed in one of the first guide hole and the second guide hole.

A size of the second guide hole in the first direction may be greater than a size of the first guide hole in the first direction, and a separation distance from the partition to the first guide hole may be equal to a separation distance from the partition to the second guide hole.

Meanwhile, the piston may include a piston body and a rod formed to protrude from the piston body in the first direction.

In addition, the damper may further include a sealing member disposed on an outer surface of the piston body.

The cylinder may be formed in a shape of which a cross-sectional area decreases from a portion of one end to the other end of the cylinder.

According to still another aspect of the present invention, there is provided a glove box including a glove box body in which a storage space is formed and a cover and the above-described damper for a glove box, wherein the glove box body is rotatably disposed in a dashboard of a vehicle, and the damper for a glove box adjusts a movement speed of the glove box body.

Other features and aspects will be apparent from the following detailed description, the drawings, and the claims.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
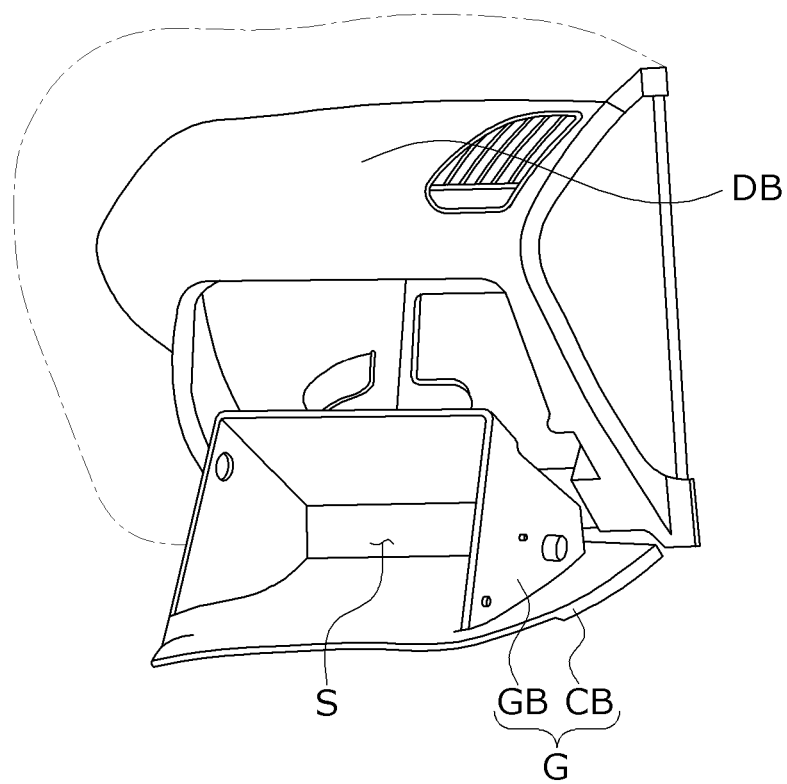
FIG. 1 is a view illustrating a glove box installed in a vehicle.

Since the present invention allows various changes and has many embodiments, specific embodiments will be illustrated in the accompanying drawings and described. However, this is not intended to limit the present invention to the specific embodiments, and it is to be appreciated that all changes, equivalents, and substitutes that fall within the spirit and technical scope of the present invention are encompassed in the present invention.

Although the terms "first," "second," and the like may be used herein to describe various elements, these elements should not be limited by these terms. These terms are only used to distinguish one element from another element. For example, a second element could be termed a first element, and a first element could similarly be termed a second element without departing from the scope of the present invention. The term "and/or" includes any one or any combination among a plurality of associated listed items.

When an element is referred to as being "connected" or "coupled" to another element, it will be understood that the element can be directly connected or coupled to another element, or other elements may be present therebetween. In contrast, when an element is referred to as being "directly connected" or "directly coupled" to another element, it will be understood that there are no intervening elements.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The terminology used herein is for the purpose of describing particular embodiments only and is not intended to limit the present invention. The singular forms are intended to include the plural forms, unless the context clearly indicates otherwise. In the present specification, it should be further understood that the terms "comprise," "comprising," "include," and/or "including," when used herein, specify the presence of stated features, numbers, steps, operations, elements, and/or components but do not preclude the presence or addition of one or more other features, numbers, steps, operations, elements, components, and/or groups thereof.

Unless otherwise defined, all terms including technical and scientific terms used herein have meanings which are the same as meanings generally understood by those skilled in the art. Terms, such as those defined in commonly used dictionaries, should be interpreted as having meanings that are consistent with their meanings in the context of the relevant art and will not be interpreted in an idealized or overly formal sense unless expressly so defined here.

Hereinafter, when embodiments are described in detail with reference to the accompanying drawings, components that are the same or correspond to each other will be denoted by the same or corresponding reference numerals in all drawings, and redundant descriptions will be omitted.

Figure 2:
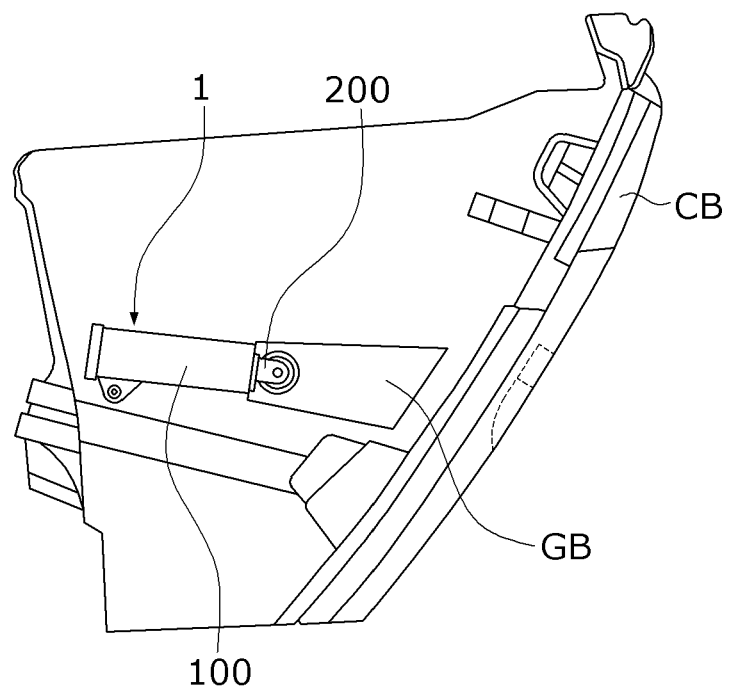
FIG. 2 is a view illustrating a state in which a glove box is closed by a damper for a glove box according to an embodiment.
Figure 3:
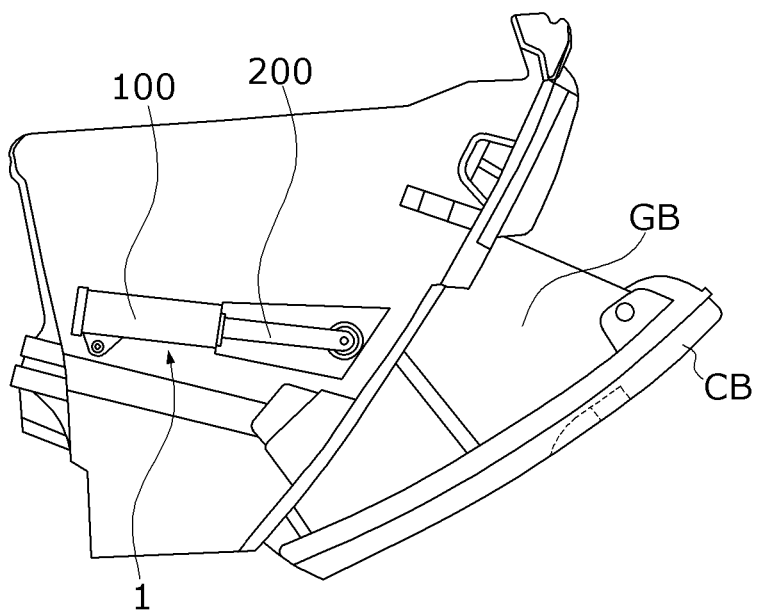
FIG. 3 is a view illustrating a state in which the glove box is opened by the damper for a glove box according to the embodiment.
Figure 4:
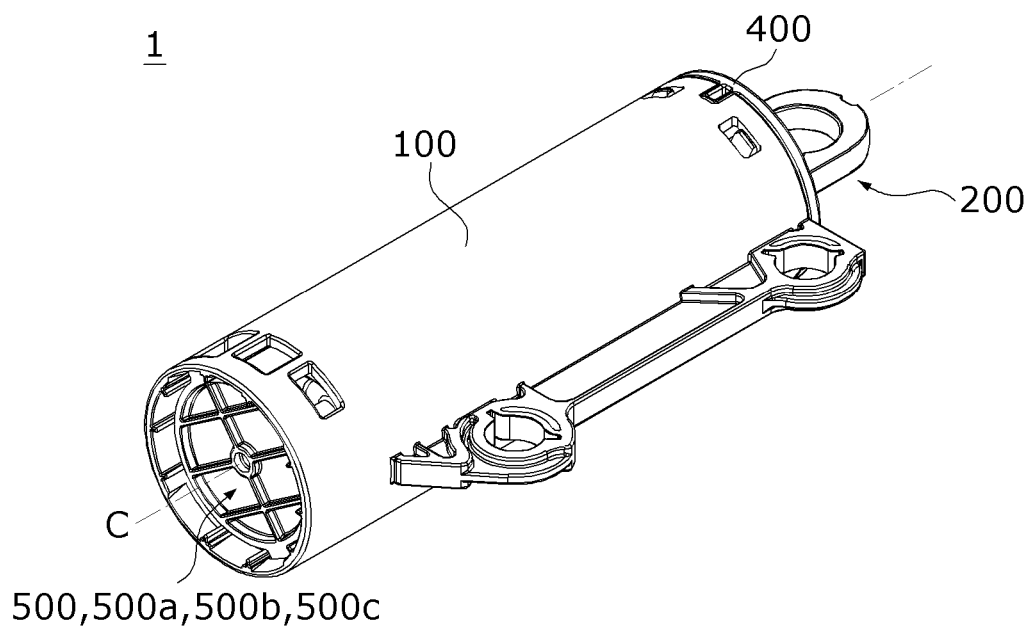
FIG. 4 is a perspective view illustrating the damper for a glove box according to the embodiment.

FIG. 1 is a view illustrating a glove box installed in a vehicle, FIG. 2 is a view illustrating a state in which a glove box is closed by a damper for a glove box according to an embodiment, FIG. 3 is a view illustrating a state in which the glove box is opened by the damper for a glove box according to the embodiment, and FIG. 4 is a perspective view illustrating the damper for a glove box according to the embodiment.

Referring to FIGS. 1 to 3, a glove box G for a vehicle may be installed in a dashboard DB in order to provide a storage space to a passenger who boards a vehicle. For example, in order to arrange the glove box G, a space may be formed in the dashboard DB. In addition, the glove box G may be rotatably disposed in the dashboard DB such that the space is opened or closed. In this case, the dashboard DB may be called an instrument panel.

The glove box G may include a glove box body GB and a cover CB forming a storage space S therein and a damper 1 for a glove box according to the embodiment which controls a movement speed of the cover CB. In this case, the glove box body GB and the cover CB may be integrally formed.

The glove box body GB may be rotatably installed in the dashboard DB.

The cover CB may open or close the space according to rotation of the glove box body GB. In this case, the damper 1 may control the movement speed of the cover CB. In addition, for smooth rotation of the cover CB, a cylinder 100 of the damper 1 may be hinge-coupled to the dashboard DB, and a piston 200 of the damper 1 may be hinge-coupled to the glove box G. In this case, the damper 1 may be an air damper using air.

Meanwhile, a rotation speed of the cover CB may be determined by a load (a weight of the cover+a weight of an object accommodated in the glove box) applied to the cover CB and a damping force of the damper 1. In this case, the damper 1 may control an opening speed of the cover CB. In this case, the opening speed of the cover CB may be the same as a movement speed of the piston 200 disposed in the damper 1.

Accordingly, even when the load of the glove box G changes, the damper 1 for a glove box according to the embodiment may control a variable amount of a valve 500, 500a, 500b, or 500c to prevent the opening speed of the cover CB from changing suddenly due to the change in the load. In this case, the variable amount may be controlled through an elastic support structure, a structure of the damper 1 by which a size of an orifice is changed, a coupling structure between the cylinder 100 and the valve 500, 500a, 500b, or 500c, and the like. In this case, a pressure difference may be generated between the inside and the outside of the cylinder 100 due to movement of the piston 200, and the valve 500, 500a, 500b, or 500c may move due to the pressure difference.

Specifically, the damper 1 may maintain the constant movement speed of the cover CB within a predetermined range regardless of the weight of the object accommodated in the storage space S through an elastic support unit which generates elasticity according to movement of the valve 500, 500a, 500b, or 500c and elastically supports the valve 500, 500a, 500b, or 500c, a structure which changes the size of the orifice according to movement of the valve 500, 500a, 500b, or 500c, and the like.

The damper 1 for a glove box according to the embodiment may have various embodiments according to a structure and an arrangement of the valve 500, 500a, 500b, or 500c and the like.

Hereinafter, embodiments will be separately described according to the valve 500, 500a, 500b, or 500c applied to the damper 1.

First Embodiment

Figure 5:
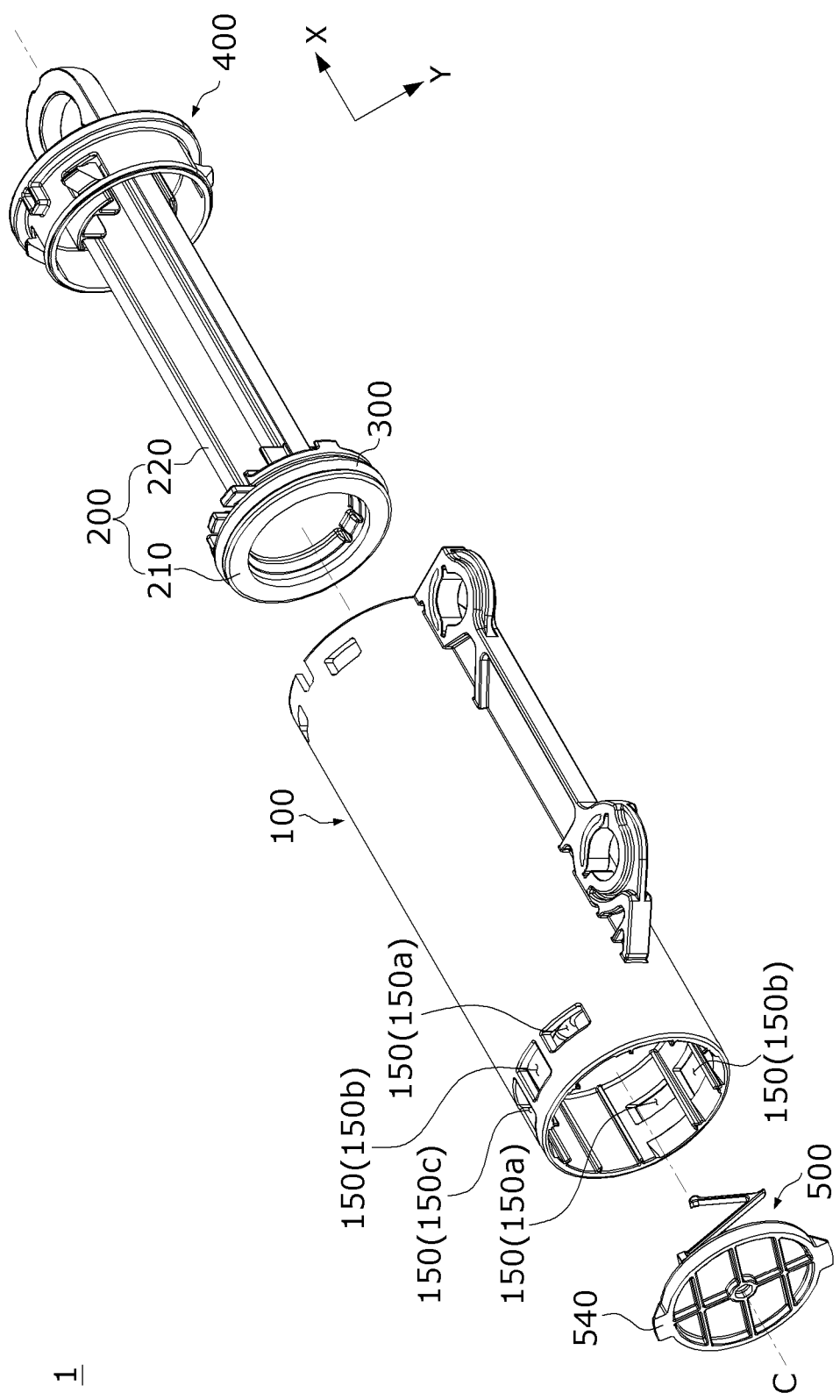
FIG. 5 is an exploded perspective view illustrating a damper for a glove box according to a first embodiment.
Figure 6:
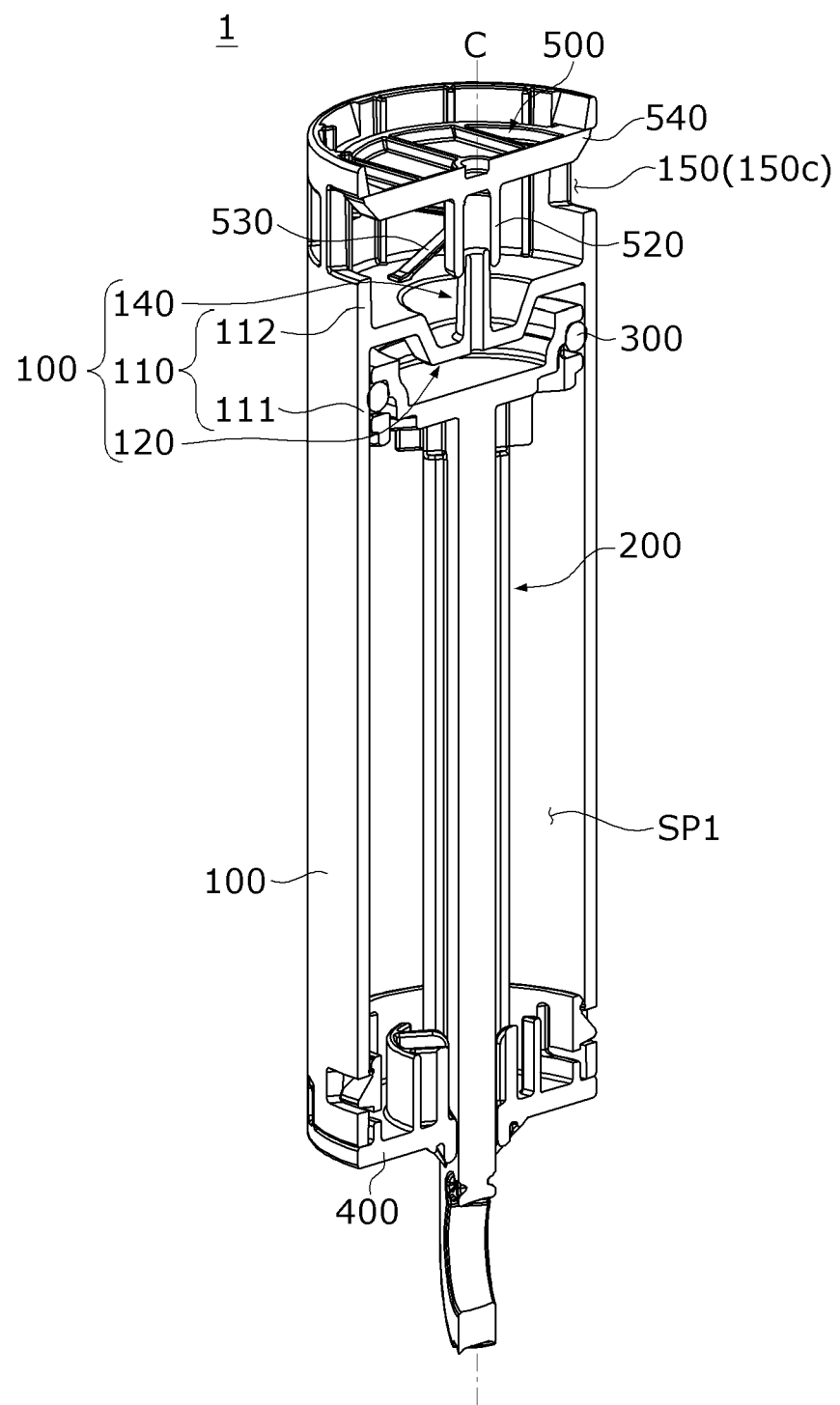
FIG. 6 is a cross-sectional perspective view illustrating the damper for a glove box according to the first embodiment.
Figure 7:
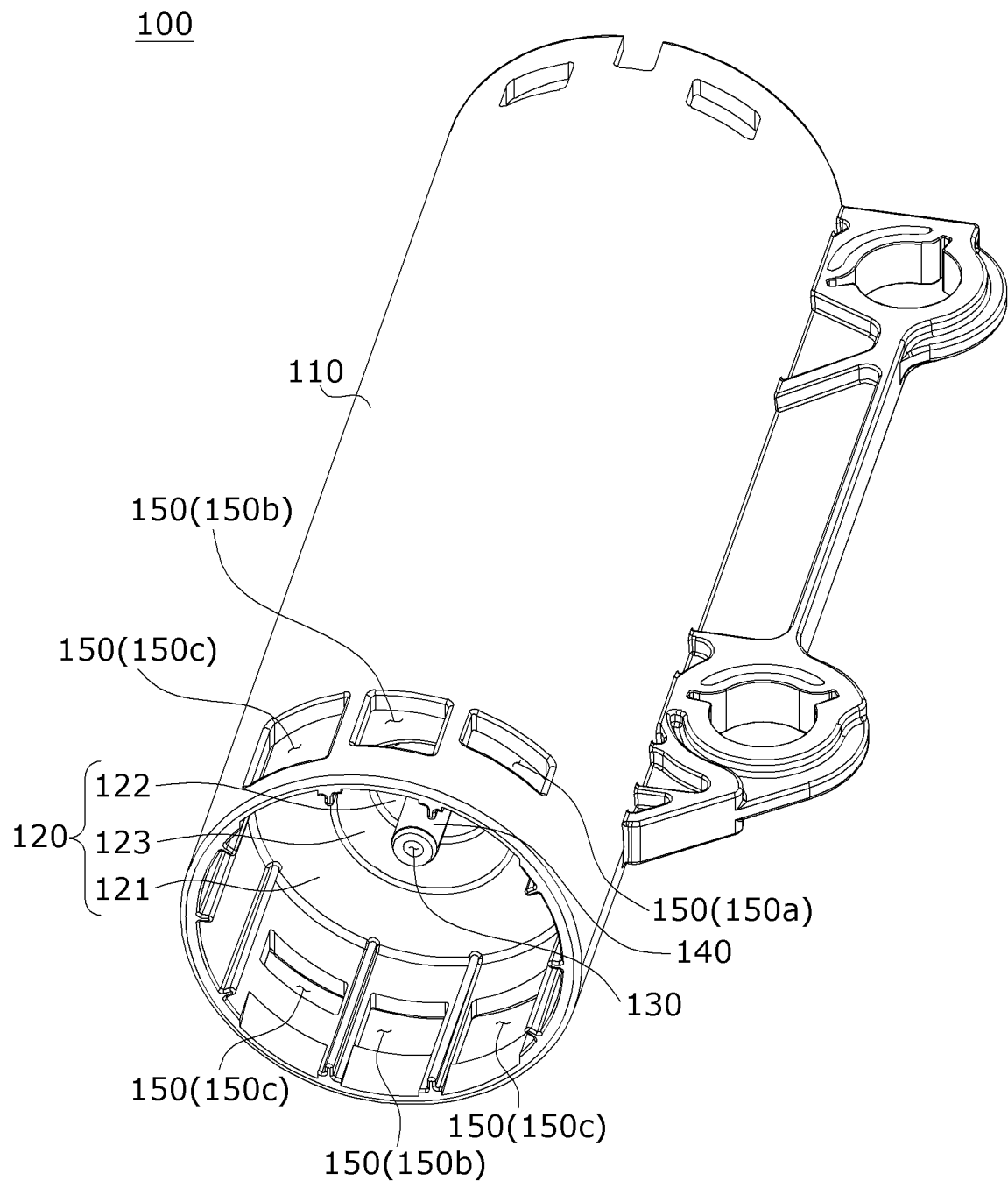
FIG. 7 is a perspective view illustrating a cylinder of the damper for a glove box according to the first embodiment.
Figure 8:
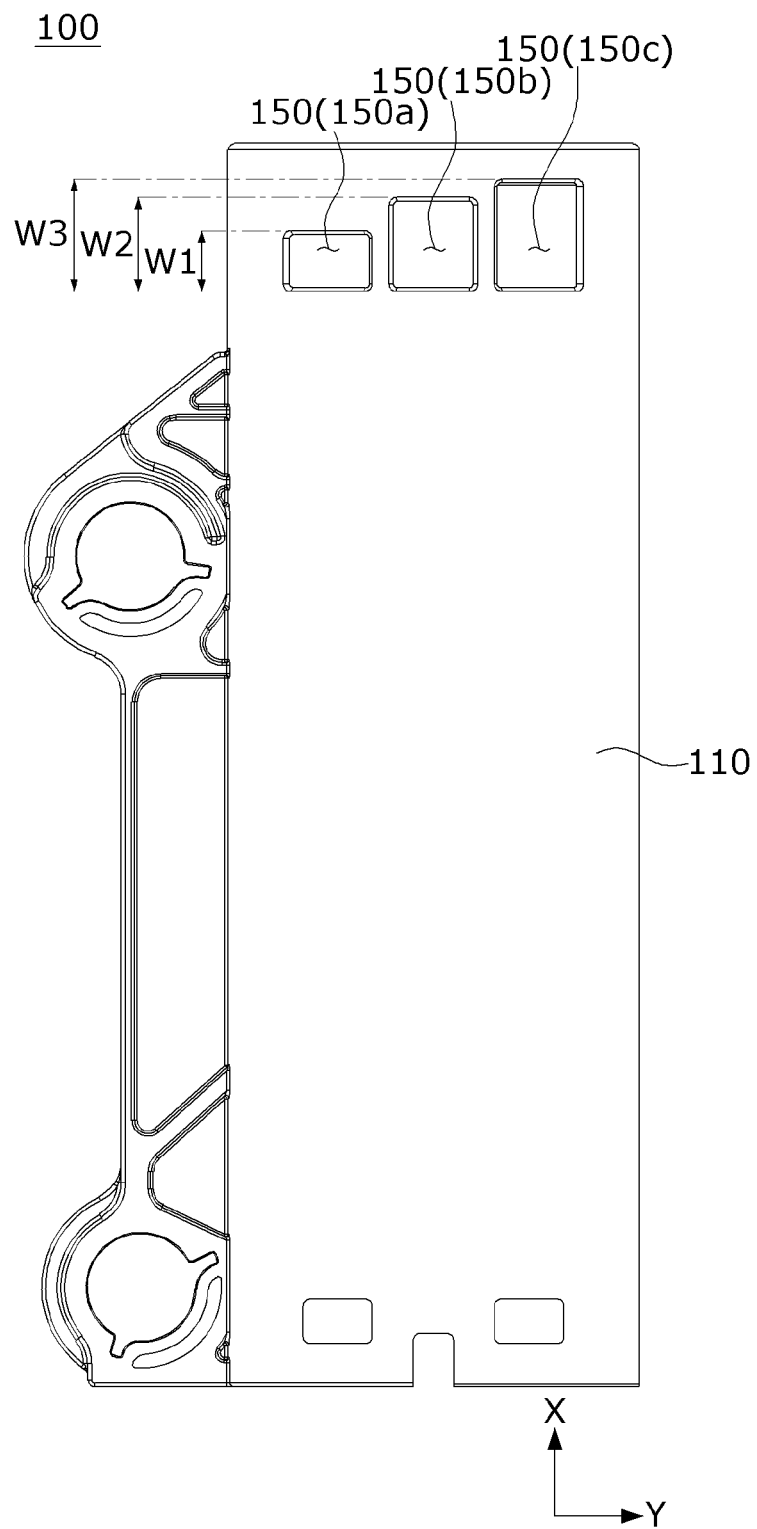
FIG. 8 is a side view illustrating the cylinder of the damper for a glove box according to the first embodiment.
Figure 9:
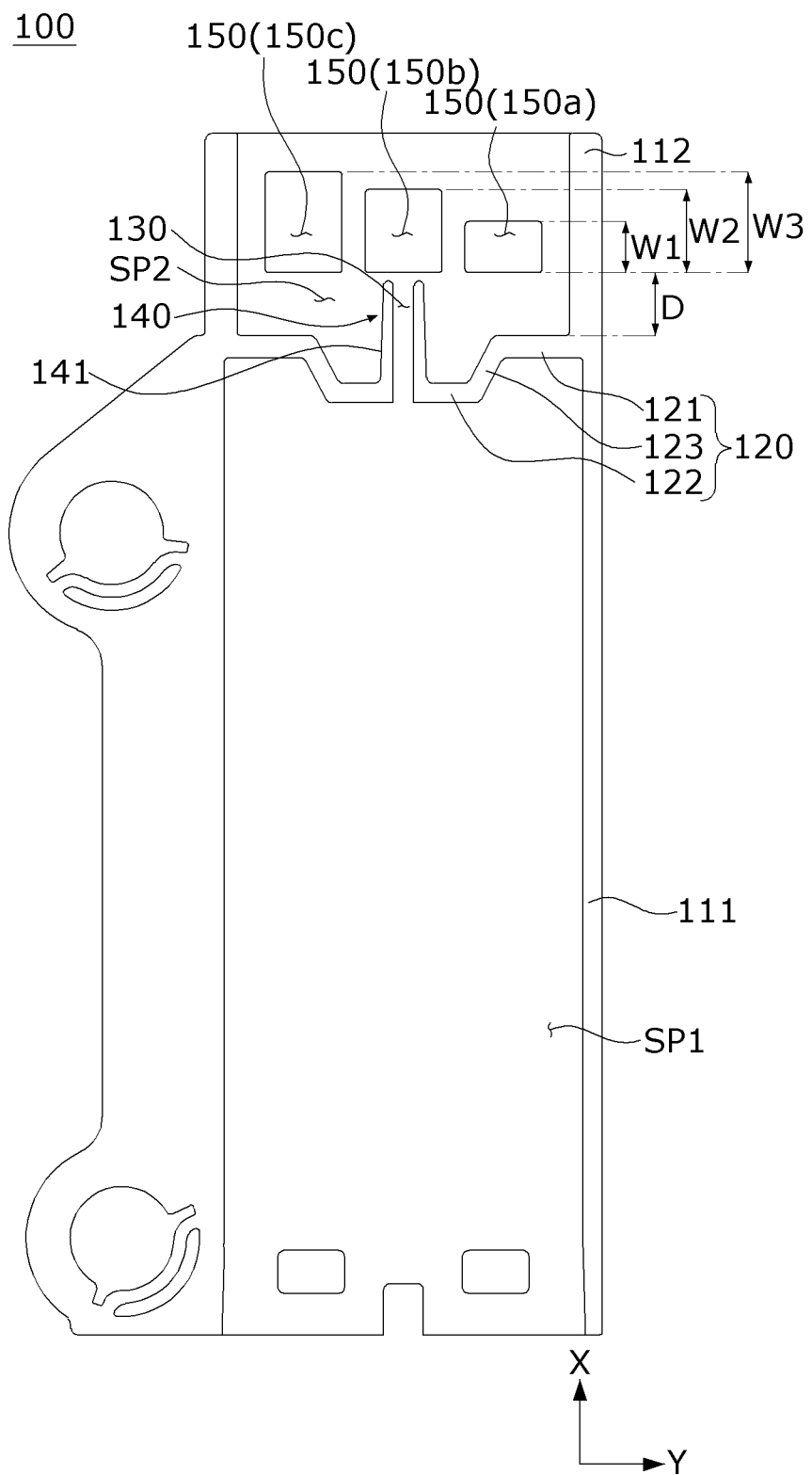
FIG. 9 is a cross-sectional view illustrating the cylinder of the damper for a glove box according to the first embodiment.

FIG. 5 is an exploded perspective view illustrating a damper for a glove box according to a first embodiment, FIG. 6 is a cross-sectional perspective view illustrating the damper for a glove box according to the first embodiment, FIG. 7 is a perspective view illustrating a cylinder of the damper for a glove box according to the first embodiment, FIG. 8 is a side view illustrating the cylinder of the damper for a glove box according to the first embodiment, and FIG. 9 is a cross-sectional view illustrating the cylinder of the damper for a glove box according to the first embodiment.

In this case, an X direction illustrated in FIGS. 5 and 6 may be a first direction, a movement direction, a longitudinal direction, or a vertical direction in the drawings, and a Y direction may be a radial direction or a horizontal direction in the drawings. In addition, the X direction may be divided into a forward direction in which a glove box G is opened and a rearward direction in which the glove box G is closed. In addition, the X direction and the Y direction may be perpendicular to each other. In addition, a reference symbol "C" may be a center of the damper 1 or valve 500 and may be disposed in a direction which is the same as the X direction.

Referring to FIGS. 5 and 6, a damper 1 according to the first embodiment may include a cylinder 100 having a tubular shape of which openings are formed at one side and the other side thereof, a piston 200 movably disposed at one side of a space formed in the cylinder 100, a sealing member 300 disposed between an inner surface of the cylinder 100 and the piston 200, a cap 400 disposed to cover the opening at one side of the cylinder 100, a valve 500 disposed at the other side of the space, and an elastic support unit which is in contact with a partition 120 of the cylinder 100 and elastically supports the valve 500.

The elastic support unit may be provided as a leg 530 integrally formed with the valve 500, and the leg 530 may be formed with an elastic structure which is in contact with and pressed by the partition 120 of the cylinder 100 due to movement of the piston 200. In this case, the leg 530 may be referred to as a first leg.

The cylinder 100 may be a rectangular member of which a length in the first direction is greater than a length in a second direction.

In addition, the cylinder 100 may be formed in a circular tubular shape in which the openings are formed at one side and the other side and the space is formed.

The cylinder 100 may include a cylinder body 110 in which a space is formed, the partition 120 which divides the space into a first space SP1 and a second space SP2, a first protruding portion 140 formed to protrude from the partition 120 so that a hole 130 formed in the partition 120 extends, and a plurality of guide holes 150 formed in the cylinder body 110 to communicate with the second space SP2.

The cylinder body 110 may include a first body 111 and a second body 112 divided by the partition 120. Accordingly, the first space SP1 is disposed in the first body 111, and the second space SP2 is disposed in the second body 112. In this case, the first space SP1 and the second space SP2 may communicate with each other through the hole 130. In addition, the hole 130 may be referred to as a communication hole.

The partition 120 may be disposed in the cylinder body 110. In addition, the hole 130 may be disposed in a central portion of the partition 120.

The partition 120 may include a first plate portion 121 having a plate shape, a second plate portion 122 disposed apart from the first plate portion in the first direction and having a plate shape, and a connection part 123 connecting the first plate portion 121 and the second plate portion 122. In this case, the second plate portion 122 may be disposed inward from the first plate portion 121. In this case, the term "inward" may refer to a direction toward a center C in the second direction, and the term "outward" may refer to a direction opposite to "inward."

The first plate portion 121 may be formed in the plate shape and disposed in the second direction. In addition, an outer side of the first plate portion 121 may be connected to the cylinder body 110.

In addition, the first plate portion 121 may be in contact with and support the leg 530 of the valve 500.

The second plate portion 122 may be formed in the plate shape and disposed apart from the first plate portion 121 in the first direction. Accordingly, a step may be formed between the first plate portion 121 and the second plate portion 122 in the first direction, and due to the step, movement of a second protruding portion 520 may be prevented from being interfered with by the partition 120.

For example, the second plate portion 122 may be disposed closer to the cap 400 than the first plate portion 121. That is, the second plate portion 122 may be disposed farther from the valve 500 than the first plate portion 121. Accordingly, a concave portion may be concavely formed in the central portion of the partition 120 in the first direction. In this case, since the second plate portion 122 forming the concave portion is disposed to face the second protruding portion 520 of the valve 500, the concave portion may expand a space in which the second protruding portion 520 of the valve 500 moves.

In addition, the hole 130 may be formed in the second plate portion 122.

The connection part 123 connects the first plate portion 121 and the second plate portion 122. As illustrated in FIG. 9, the connection part 123 may be formed to be inclined at a predetermined angle.

The hole 130 may be formed to pass through the partition 120 in the first direction. Accordingly, the hole 130 allows the first space SP1 and the second space SP2 to communicate with each other and air to move between the first space SP1 and the second space SP2.

The first protruding portion 140 may allow the hole 130 to extend. Accordingly, the hole 130 may be disposed in the first protruding portion 140. In this case, the first protruding portion 140 may be referred to as a first sleeve or first boss.

In addition, the first protruding portion 140 may be formed to protrude in the first direction. As illustrated in FIG. 9, the first protruding portion 140 may be formed to protrude toward the valve 500.

In addition, the first protruding portion 140 may be formed in a shape of which a cross-sectional area decreases toward an end portion thereof. As illustrated in FIG. 9, the first protruding portion 140 may be formed in a tapered shape. Accordingly, an outer surface 141 of the first protruding portion 140 may include an inclined surface having a predetermined inclination.

Meanwhile, the end portion of the first protruding portion 140 may be disposed in the second protruding portion 520 of the valve 500. In this case, the end portion of the first protruding portion 140 may be disposed to overlap the second protruding portion 520 in the second direction. Accordingly, an orifice O may be formed between the outer surface 141 of the first protruding portion 140 and an inner surface 521a of the second protruding portion 520.

Accordingly, the end portion of the first protruding portion 140 may be formed in the second protruding portion 520 to have a predetermined volume. In this case, since the valve 500 may move in the first direction due to movement of the piston 200, the volume of the first protruding portion 140 in the second protruding portion 520 may be changed.

For example, as the volume of the first protruding portion 140 in the second protruding portion 520 decreases, a flow path which is a space in which air moves and a size of the orifice O decrease, and thus a damping force of the damper 1 increases. In addition, due to the increase in the damping force, a movement speed of the piston 200 decreases. Accordingly, even when a load of the glove box G increases, smooth opening of the glove box G can be assisted.

Meanwhile, a depth to which the first protruding portion 140 is inserted into the second protruding portion 520 may be restricted due to positions of the guide holes 150 to which protrusions 540 of the valve 500 are coupled, sizes of the guide holes 150 in the first direction, and an elastic force of the leg 530 provided as an elastic support member.

Referring to FIGS. 7 to 9, the plurality of guide holes 150 may be formed in the second body 112. Accordingly, the guide holes 150 may allow the second space SP2 to communicate with the outside.

In addition, the plurality of guide holes 150 may be disposed apart from each other along a circumference of the second body 112. For example, since the second body 112 may be formed in a cylindrical shape, the plurality of guide holes 150 may be disposed apart from each other in a circumferential direction of the second body 112.

In addition, each of the protrusions 540 of the valve 500 may be disposed in any one of the plurality of guide holes 150.

In this case, sizes of the guide holes 150 in the first direction may be greater than sizes of the protrusions 540 in the first direction. Accordingly, the sizes of the guide holes 150 in the first direction may restrict a stroke which is a movement range of the valve 500 in the first direction. That is, the stroke of the valve 500 in the first direction may be restricted due to the sizes of the guide holes 150, to which the protrusions 540 are coupled, in the first direction. In this case, the sizes of the guide holes 150 in the first direction may be referred to as widths of the guide holes 150.

The plurality of guide holes 150 may include first guide holes 150a, second guide holes 150b, and third guide holes 150c having different sizes in the first direction. In addition, each of the first guide holes 150a, the second guide holes 150b, and the third guide holes 150c may be symmetrically disposed in the second body 112 in pairs.

As illustrated in FIGS. 8 and 9, a size W2 of the second guide hole 150b in the first direction may be greater than a size W1 of the first guide hole 150a in the first direction. In addition, a size W3 of the third guide hole 150c in the first direction may be greater than the size W2 of the second guide hole 150b in the first direction. In this case, widths of the first guide holes 150a, the second guide holes 150b, and the third guide holes 150c in the circumferential direction may be the same. In this case, the size W1 of the first guide hole 150a in the first direction may be referred to as a first width. In addition, the size W2 of the second guide hole 150b in the first direction may be referred to as a second width. In addition, the size W3 of the third guide hole 150c in the first direction may be referred to as a third width.

Accordingly, each of the protrusions 540 of the valve 500 may be coupled to any one of the first guide holes 150a, the second guide holes 150b, and the third guide holes 150c according to a use so that the valve 500 of the damper 1 is used for a proper load within a range between a light load and a heavy load of the glove box G.

For example, when the load of the glove box G is light, the protrusions 540 may be coupled to the first guide holes 150a. Alternatively, when the load of the glove box G is a middle load, the protrusions 540 may be coupled to the second guide holes 150b. Alternatively, when the load of the glove box G is heavy, the protrusions 540 may be coupled to the third guide holes 150c. In this case, ranges of the light load, the middle load, and the heavy load may be provided as values of predetermined ranges.

When only the first guide holes 150a and the second guide holes 150b are provided as the plurality of guide holes 150, the first guide holes 150a may be used for the light load, and the second guide holes 150b may be used for the heavy load.

Referring to FIG. 9, a separation distance D from the partition 120 to the first guide holes 150a may be the same as a separation distance D from the partition 120 to the second guide holes 150b. In addition, a separation distance D from the partition 120 to the third guide holes 150c may be the same as a separation distance D from the partition 120 to the second guide holes 150b.

That is, all of the first guide holes 150a, the second guide holes 150b, and the third guide holes 150c may be disposed in the second body 112 to have the same separation distances D from the partition 120.

Figure 10:
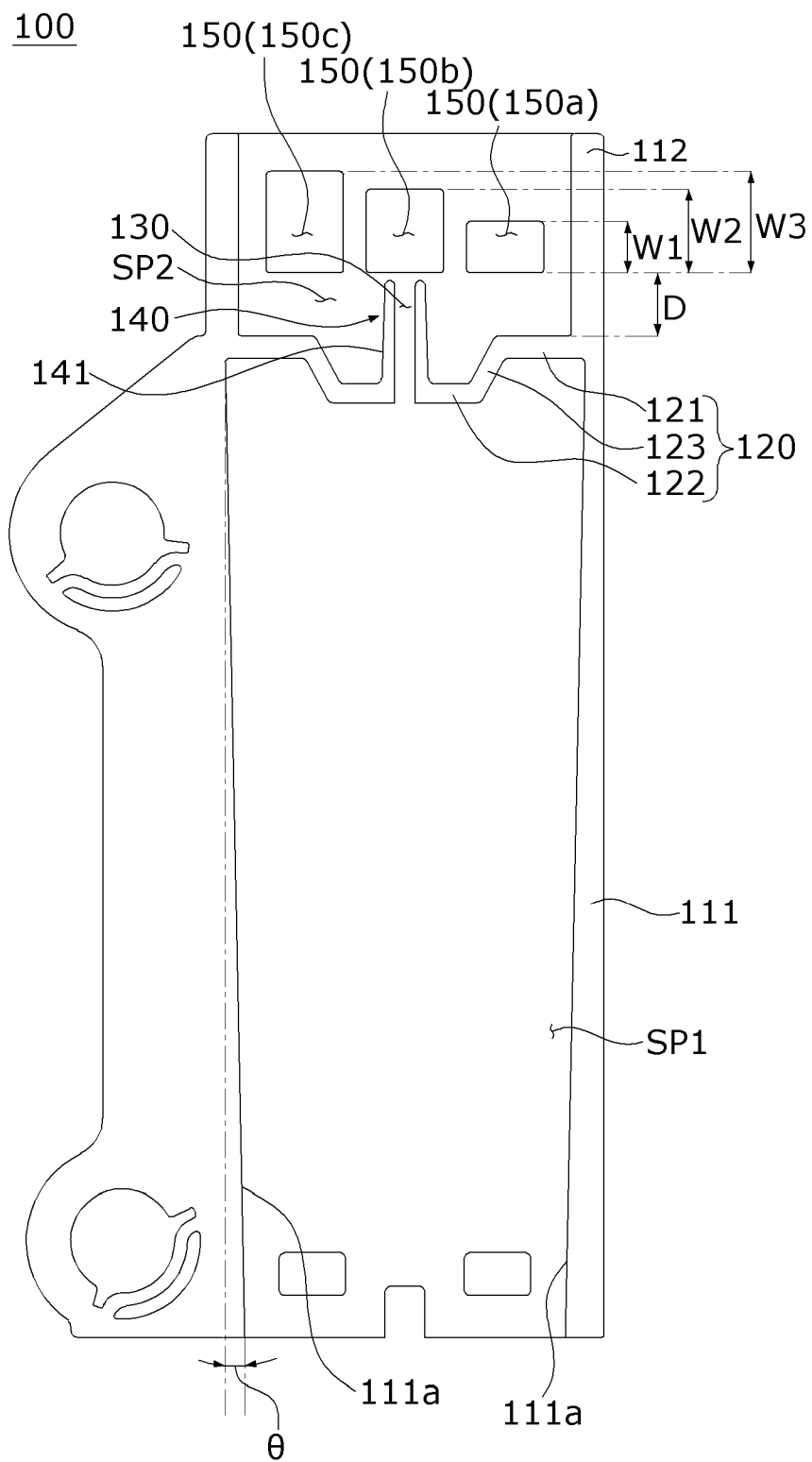
FIG. 10 is a cross-sectional view illustrating a modified example of the cylinder of the damper for a glove box according to the embodiment.

FIG. 10 is a cross-sectional view illustrating a modified example of the cylinder of the damper for a glove box according to the embodiment.

Referring to FIG. 10, a space formed in the cylinder 100 may also be formed in a tapered shape. Specifically, the space may be formed in a tapered shape of which a cross-sectional area decreases from one end to the other end of the cylinder 100. Accordingly, the inner surface of the cylinder 100 may include an inclined surface 111a having a predetermined inclination angle θ in the first direction. In this case, the inclined surface 111a may be formed in the first space SP1.

Accordingly, as the piston 200 moves in a direction in which the cap 400 is disposed, a friction force between the sealing member 300 disposed on the piston 200 and the inclined surface 111a may increase, and the movement speed of the piston 200 may gradually decrease. In addition, a decrease in the movement speed may assist smooth opening of the glove box G.

As illustrated in FIG. 10, an example of the inclined surface 111a formed on the entirety of an inner surface of the first body 111 is illustrated, but the present invention is not necessarily limited thereto. For example, the inclined surface 111a may be formed on a part of the inner surface of the first body 111. Specifically, the inclined surface 111a may also be formed at only a front side of the inner surface of the first body 111.

The piston 200 may move along the inner surface of the first body 111 in the first space SP1 in the first direction in conjunction with movement of the cover CB. Accordingly, a pressure difference may be generated between the inside and the outside of the cylinder 100, and a position of the valve 500 may be changed due to the pressure difference.

The piston 200 may include a piston body 210 and a rod 220 formed to protrude from the piston body 210 in the first direction.

The piston body 210 may move along the inner surface of the first body 111 in the first direction.

In addition, the piston body 210 may be formed in a disc shape.

In addition, a groove may be concavely formed in an outer circumferential surface of the piston body 210 in the second direction, and the sealing member 300 may be disposed in the groove.

The rod 220 may be integrally formed with the piston body 210 to protrude from the piston body 210 toward the cap 400 in the first direction. In this case, the rod 220 may be provided as a rectangular member of which a length is greater than a width.

In addition, an end portion of the rod 220 may be exposed to the outside. In addition, the end portion of the rod 220 may be hinge-coupled to the glove box G.

Accordingly, the piston rod 220 may move linearly in conjunction with rotation of the glove box G. In addition, a pressure difference may be generated between the inside and the outside of the cylinder 100 due to the piston body 210 which moves in conjunction with movement of the piston rod 220.

Accordingly, an opening speed of the glove box G may be changed due to the movement speed of the piston 200.

The sealing member 300 may be disposed in the groove formed in the piston body 210. In addition, an outer side of the sealing member 300 may be in contact with the inner surface of the first body 111.

In this case, the sealing member 300 may be formed of an elastic material such as rubber. Accordingly, the sealing member 300 may be pressed against the inner surface of the first body 111. In this case, an O-ring may be provided as the sealing member 300.

Meanwhile, a lubricant such as grease may be applied on the inner surface of the cylinder 100. Accordingly, friction between the sealing member 300 and the inner surface of the cylinder 100 may decrease.

The cap 400 may be disposed to cover the opening formed at one end portion of the cylinder 100.

In addition, the cap 400 may include a hole formed to guide movement of the rod 220.

The second space SP2 may be disposed in the valve 500.

In addition, the valve 500 may adjust the damping force of the damper 1 while moving in the first direction due to movement of the piston 200. In this case, the valve 500 may adjust the damping force of the damper 1 using the second protruding portion 520 forming a flow path changed according to an arrangement with respect to the first protruding portion 140 and the leg 530 which is the elastic support unit in contact with the partition 120.

In addition, the valve 500 may be formed of an elastic material or formed with a structure having an elastic reinforcing force.

For example, the valve 500 may be formed of an elastic material, such as rubber or silicone, capable of elastic deformation.

Alternatively, the valve 500 may be formed of a synthetic resin material having a predetermined stiffness. However, even when the valve 500 is formed of a material such as plastic having a predetermined stiffness, the valve 500 may be elastically supported through an elastic structure generating an elastic force through contact with the partition 120.

Figure 11:
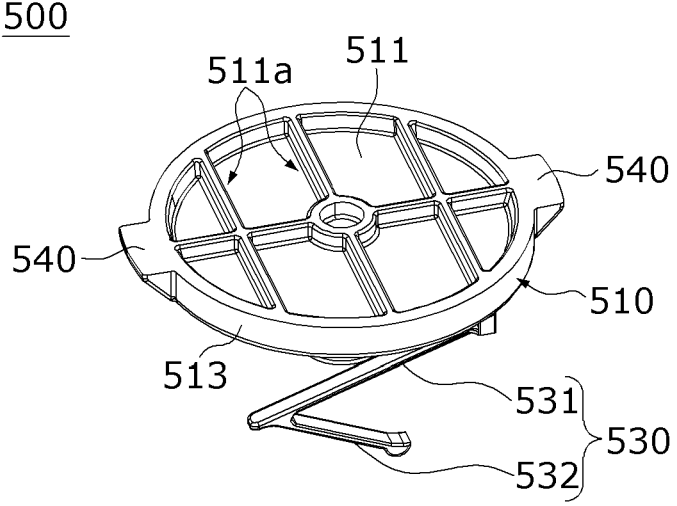
FIG. 11 is a perspective view illustrating a valve of the damper for a glove box according to the first embodiment.
Figure 12:
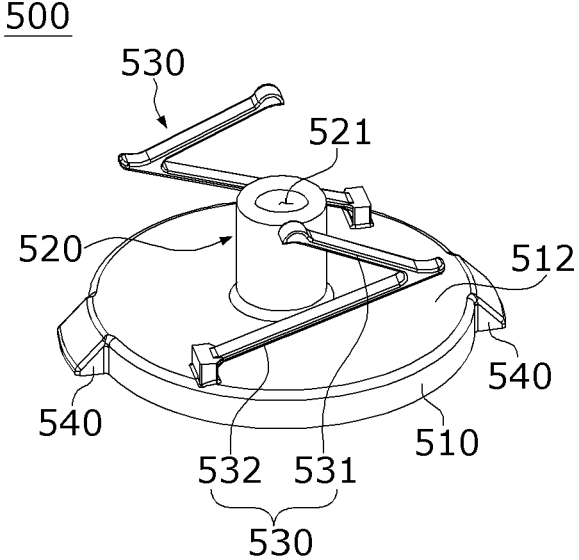
FIG. 12 is a perspective bottom view illustrating the valve of the damper for a glove box according to the first embodiment.
Figure 13:
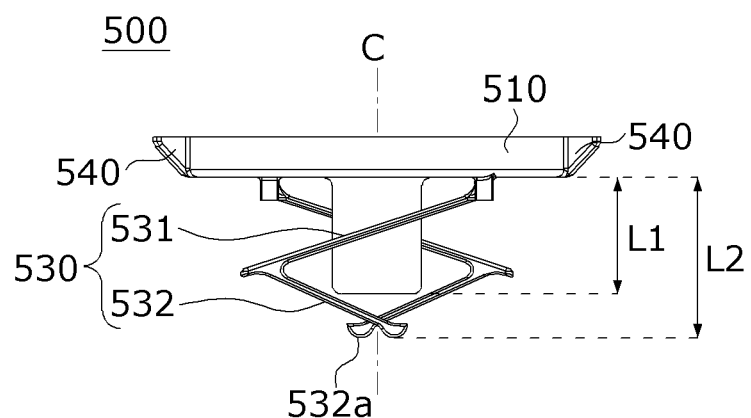
FIG. 13 is a side view illustrating the valve of the damper for a glove box according to the first embodiment.
Figure 14:
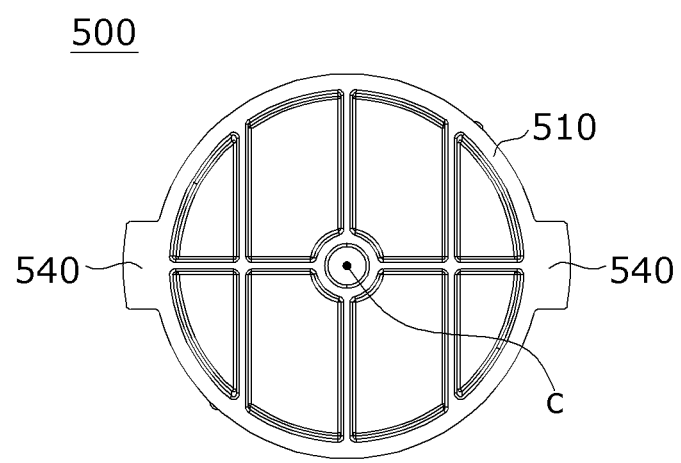
FIG. 14 is a plan view illustrating the valve of the damper for a glove box according to the first embodiment.
Figure 15:
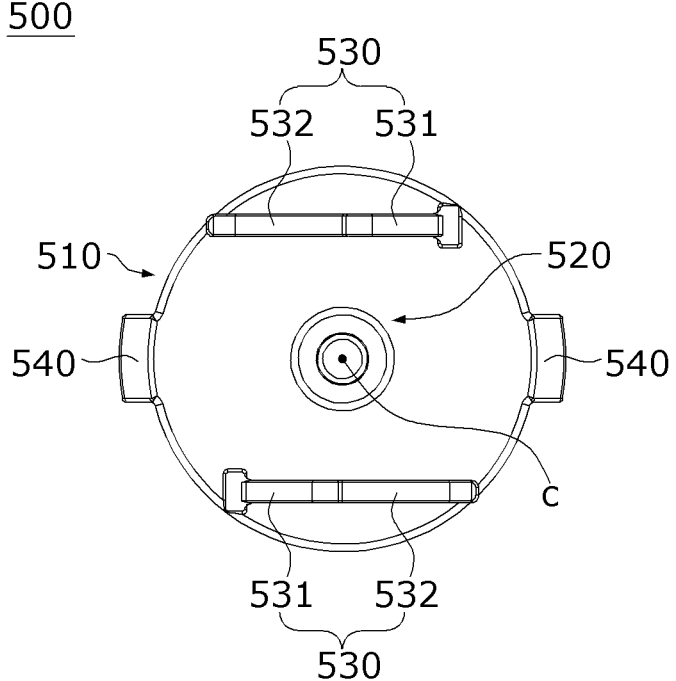
FIG. 15 is a bottom view illustrating the valve of the damper for a glove box according to the first embodiment.

FIG. 11 is a perspective view illustrating the valve of the damper for a glove box according to the first embodiment, FIG. 12 is a perspective bottom view illustrating the valve of the damper for a glove box according to the first embodiment, FIG. 13 is a side view illustrating the valve of the damper for a glove box according to the first embodiment, FIG. 14 is a plan view illustrating the valve of the damper for a glove box according to the first embodiment, and FIG. 15 is a bottom view illustrating the valve of the damper for a glove box according to the first embodiment.

Referring to FIGS. 11 to 15, the valve 500 may include a valve body 510 having a plate shape, the second protruding portion 520 formed to protrude from the valve body 510 so that the end portion of the first protruding portion 140 is disposed in the second protruding portion 520, the leg 530 formed to protrude from the valve body 510, and the protrusion 540 formed to protrude from an outer surface 513 of the valve body 510 in the second direction. In this case, the leg 530 may be provided as the elastic support unit. In this case, the valve body 510, the second protruding portion 520, the leg 530, and the protrusion 540 may be integrally formed. Accordingly, the valve 500 may be provided as a single part.

The valve body 510 may include an upper surface 511, a lower surface 512, and the outer surface 513 connecting the upper surface 511 and the lower surface 512 and may be formed in a disc shape.

In addition, a plurality of ribs 511a may be formed on the upper surface 511 of the valve body 510. In this case, the ribs 511a allow the valve body 510 to secure stiffness.

The second protruding portion 520 may be formed to protrude from the lower surface 512 of the valve body 510 in the first direction. In this case, the leg 530 may be disposed apart from the second protruding portion 520.

In addition, the second protruding portion 520 may include a groove 521 formed therein. In addition, the end portion of the first protruding portion 140 may be disposed in the groove 521.

Accordingly, while the end portion of the first protruding portion 140 moves in the groove 521 in the first direction, the volume of the first protruding portion 140 in the second protruding portion 520 may be changed. In addition, since the size of the orifice O changes due to the change in the volume, the damping force of the damper 1 may be adjusted.

The leg 530 may be formed to protrude from the lower surface 512 of the valve body 510 toward the partition 120. In this case, based on the lower surface 512 of the valve body 510, a protruding length L2 of the leg 530 in the first direction may be greater than a protruding length L1 of the second protruding portion 520 in the first direction. The protruding length L1 of the second protruding portion 520 in the first direction may be referred to as a first length or first height. In addition, the protruding length L2 of the leg 530 in the first direction may be referred to as a second length or second height.

In addition, the leg 530 may be disposed on one surface of the valve body 510 to be inclined at a predetermined angle to implement an elastic support structure. Accordingly, the leg 530 may be used as the elastic support unit.

For example, the leg 530 may be formed in a bar shape. Accordingly, the leg 530 is formed to have one fixed end connected to the valve body 510 and generates an elastic force smaller than an elastic force of each of other legs 530a and 530b which will be described below. However, in order to supplement the elastic force, the leg 530 may be implemented with a zigzag structure. In this case, the valve 500 including the leg 530 having the bar shape may be referred to as a first valve.

Referring to FIGS. 11 to 13, the leg 530 may include a first region 531 obliquely disposed on the lower surface 512 of the valve body 510 and a second region 532 obliquely disposed from an end portion of the first region 531. In this case, the second region 532 may be disposed to overlap the first region 531 in the first direction. Accordingly, since the leg 530 is formed with the zigzag structure through the first region 531 and the second region 532, a large elastic force may be generated in a small space.

In addition, the second region 532 may include a curved surface 532a formed on an end portion of the second region 532. In addition, the curved surface 532a may be in contact with the first plate portion 121 of the partition 120. Accordingly, the second region 532 may be in line or point contact with the first plate portion 121.

Meanwhile, the leg 530 may be provided as a plurality of legs 530. In addition, the plurality of legs 530 may be disposed to be rotationally symmetrical with respect to the center C of the valve body 510. Accordingly, the plurality of legs 530 may generate a constant elastic force.

The protrusion 540 may be formed to protrude from the valve body 510 to correspond to the guide hole 150. As illustrated in FIGS. 11 to 15, the protrusion 540 may be formed to protrude from the outer surface 513 of the valve body 510 in the second direction.

Accordingly, the protrusion 540 may be disposed in the guide hole 150 and used as a unit which restricts a movement range of the valve 500 when the valve 500 moves. Specifically, the movement range of the valve 500 may be restricted due to coupling between the protrusion 540 and the guide hole 150 and a size of the guide hole 150 in the first direction.

Figure 16:
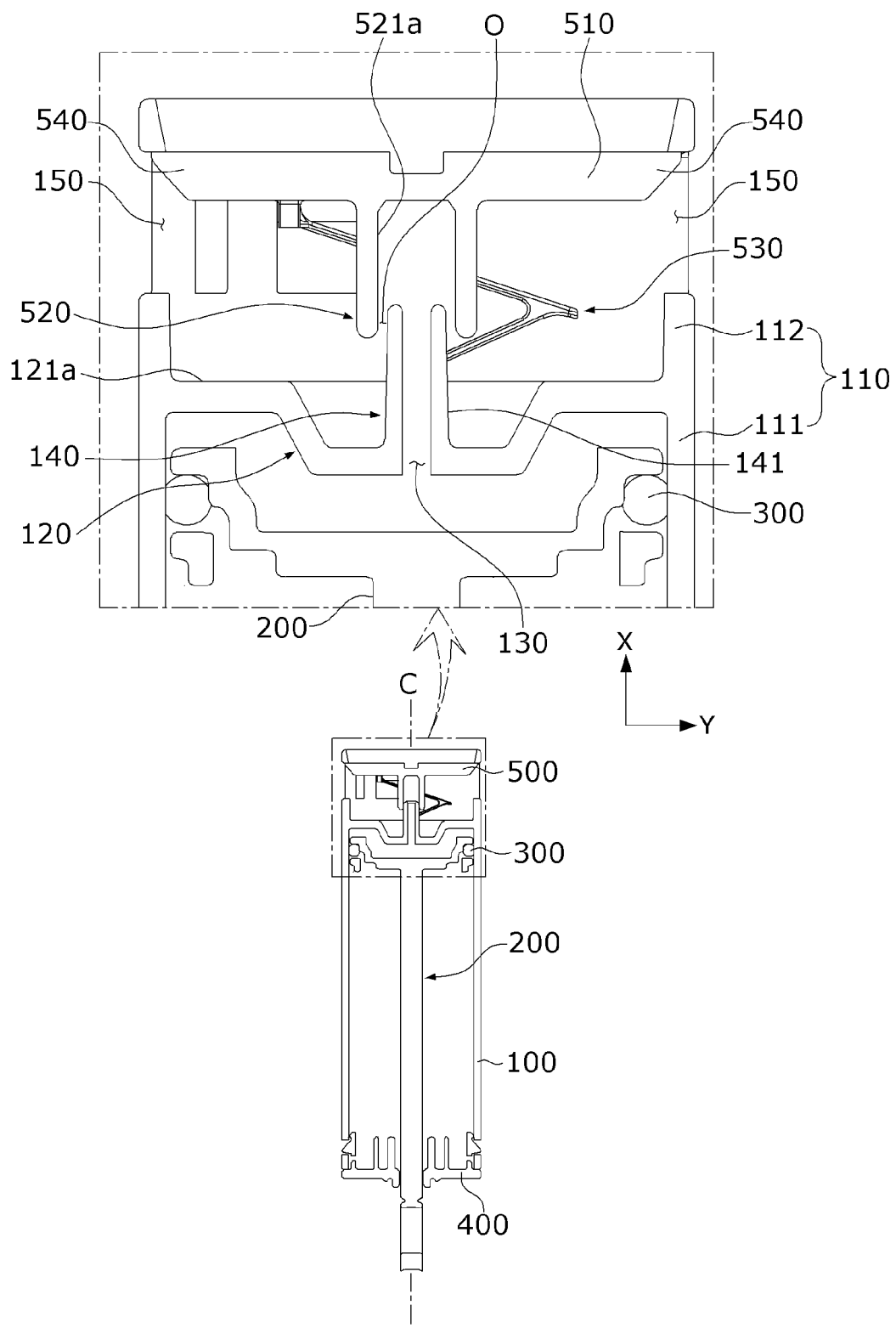
FIGS. 16 and 17 are views illustrating operation of the damper for a glove box according to the first embodiment.
Figure 17:
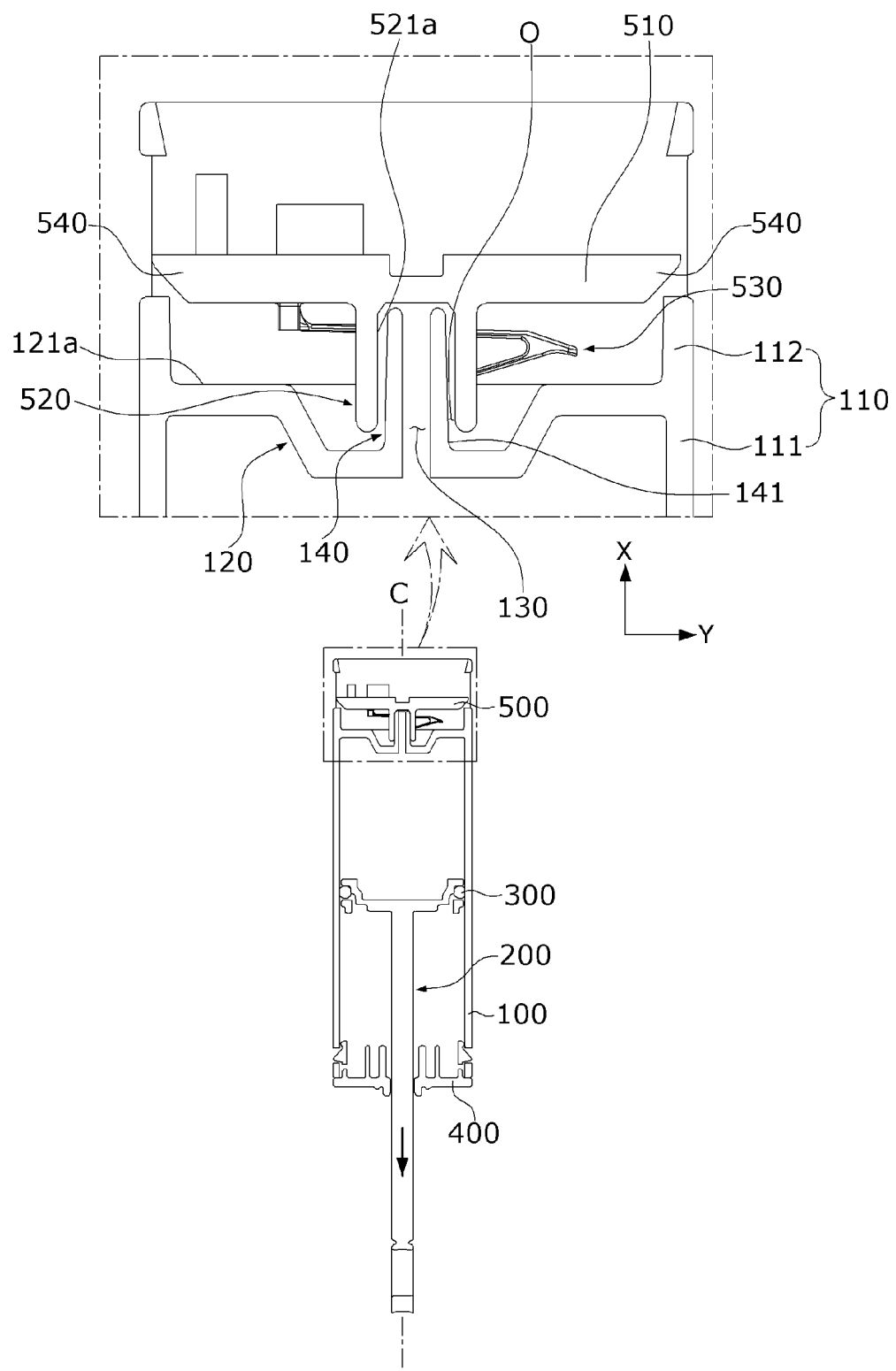

FIGS. 16 and 17 are views illustrating operation of the damper for a glove box according to the first embodiment, FIG. 16 is a view illustrating a position of the valve when the glove box is closed, and FIG. 17 is a view illustrating a position of the valve when the glove box is opened.

Referring to FIGS. 16 and 17, the valve 500 moves due to movement of the piston 200. Accordingly, while the leg 530 of the valve 500 is in contact with and pressed by an upper surface 121a of the first plate portion 121, the leg 530 is deformed. In addition, the elastic force of the leg 530 generated due to the deformation of the leg 530 may be one factor in generation of the damping force of the damper 1.

Second Embodiment

Figure 18:
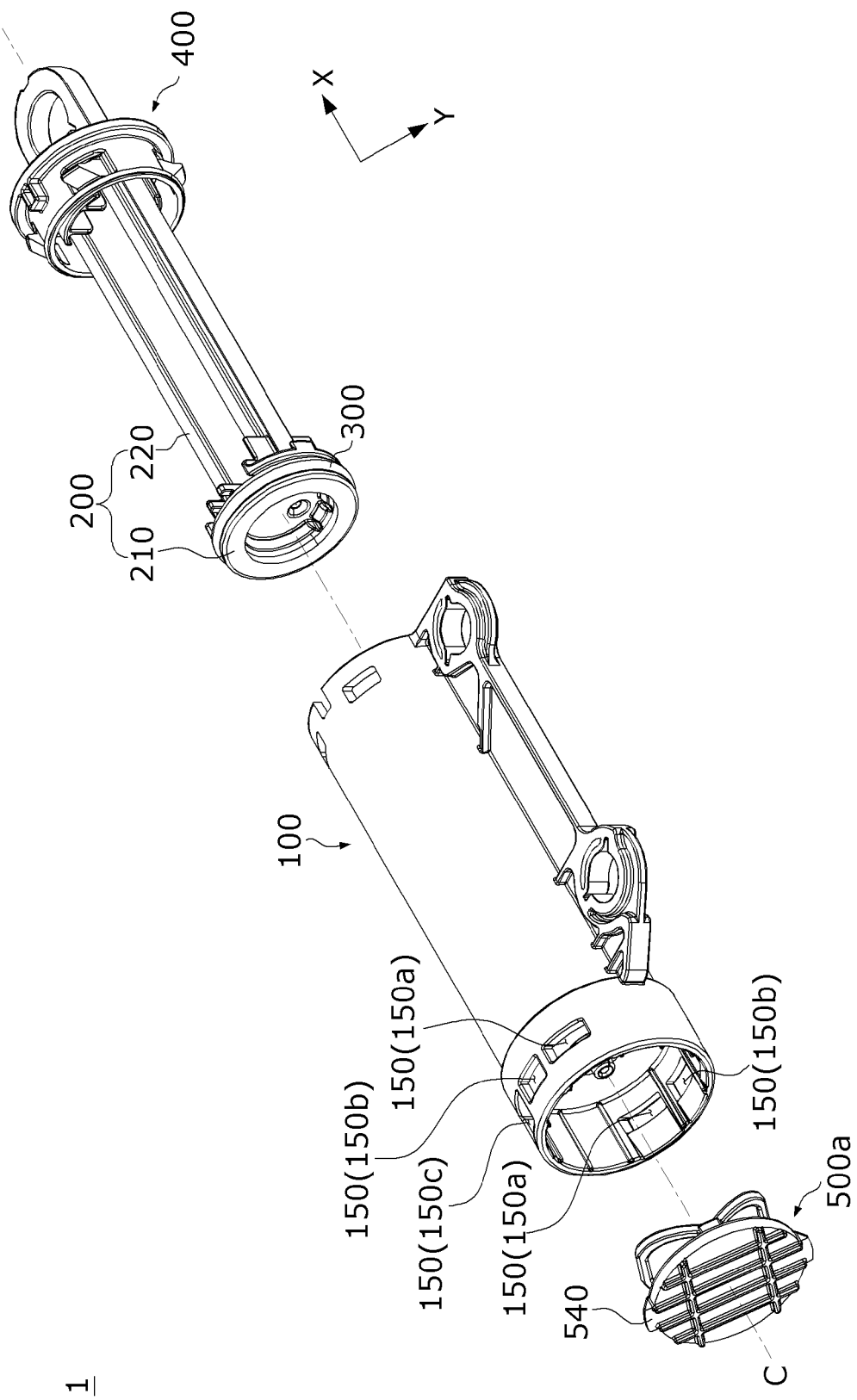
FIG. 18 is an exploded perspective view illustrating a damper for a glove box according to a second embodiment.
Figure 19:
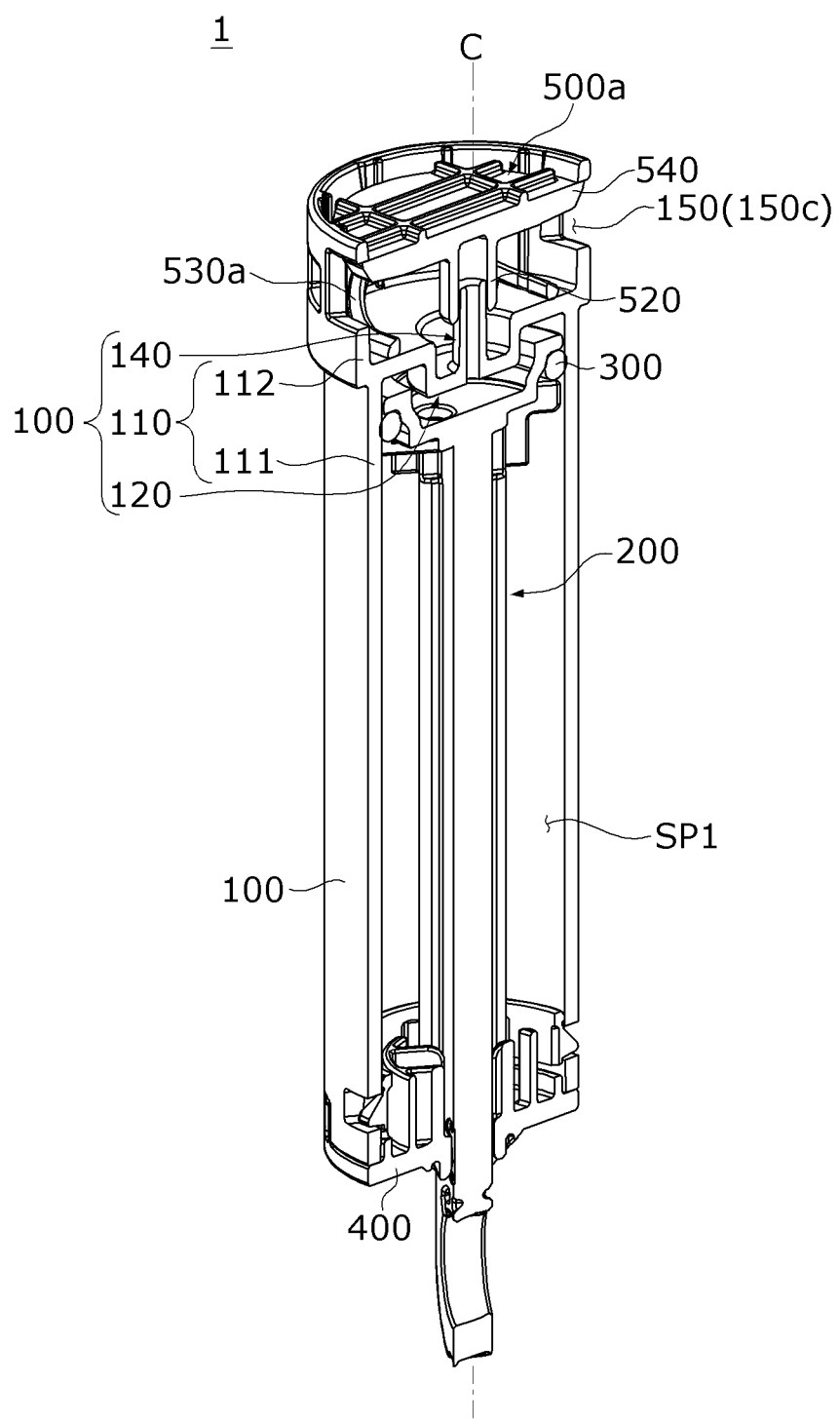
FIG. 19 is a cross-sectional perspective view illustrating the damper for a glove box according to the second embodiment.
Figure 20:
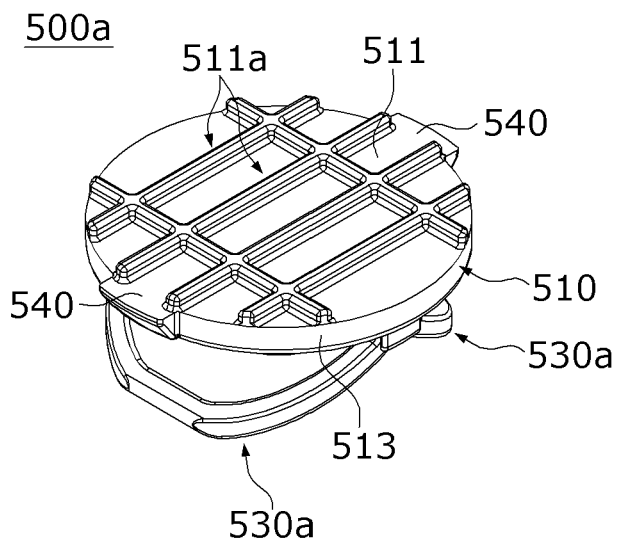
FIG. 20 is a perspective view illustrating a valve of the damper for a glove box according to the second embodiment.
Figure 21:
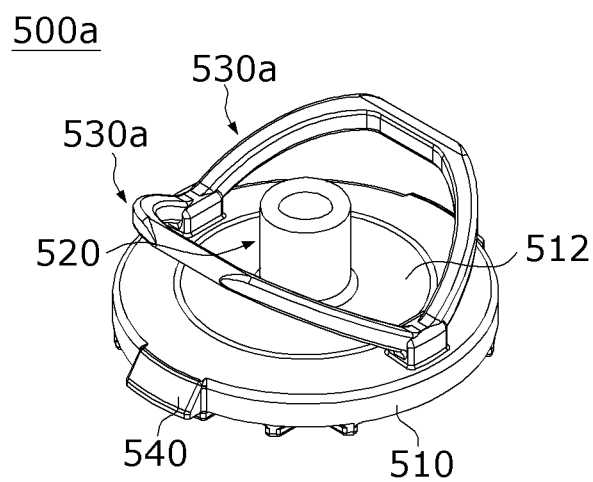
FIG. 21 is a perspective bottom view illustrating the valve of the damper for a glove box according to the second embodiment.
Figure 22:
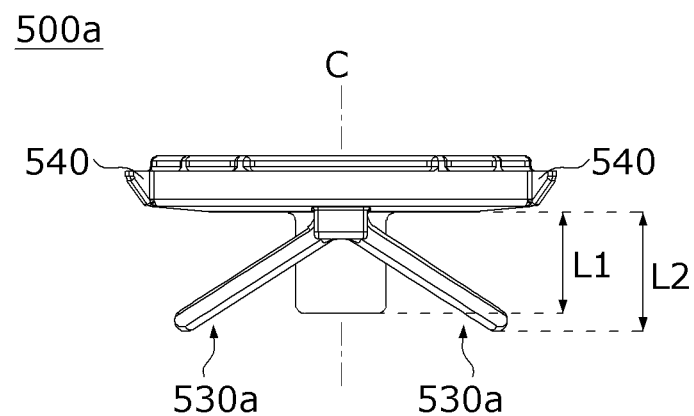
FIG. 22 is a side view illustrating the valve of the damper for a glove box according to the second embodiment.
Figure 23:
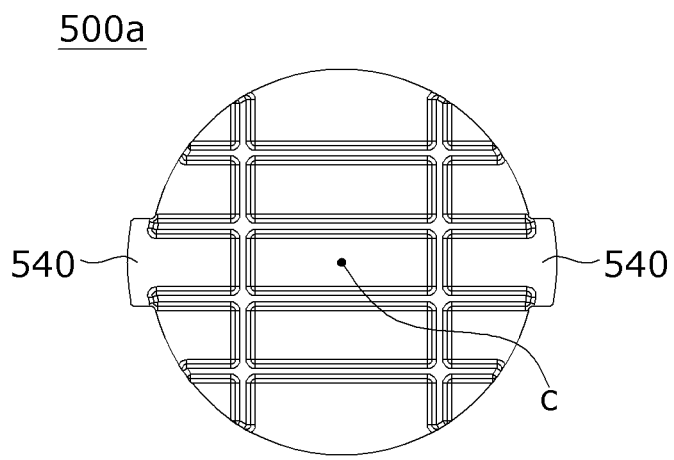
FIG. 23 is a plan view illustrating the valve of the damper for a glove box according to the second embodiment.
Figure 24:
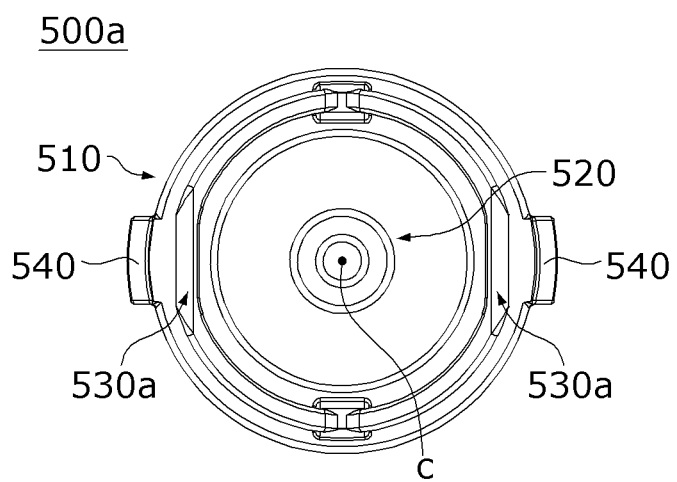
FIG. 24 is a bottom view illustrating the valve of the damper for a glove box according to the second embodiment.

FIG. 18 is an exploded perspective view illustrating a damper for a glove box according to a second embodiment, FIG. 19 is a cross-sectional perspective view illustrating the damper for a glove box according to the second embodiment, FIG. 20 is a perspective view illustrating a valve of the damper for a glove box according to the second embodiment, FIG. 21 is a perspective bottom view illustrating the valve of the damper for a glove box according to the second embodiment, FIG. 22 is a side view illustrating the valve of the damper for a glove box according to the second embodiment, FIG. 23 is a plan view illustrating the valve of the damper for a glove box according to the second embodiment, and FIG. 24 is a bottom view illustrating the valve of the damper for a glove box according to the second embodiment.

Referring to FIGS. 5 to 24, there is a difference in the shape of the valve between the damper for a glove box according to the first embodiment and the damper for a glove box according to the second embodiment.

In description of the damper for a glove box according to the second embodiment, the same reference symbols are assigned to components which are the same as those of the damper for a glove box according to the first embodiment, and detailed descriptions thereof will be omitted.

Referring to FIGS. 18 to 24, a damper 1 according to the second embodiment may include a cylinder 100, a piston 200 movably disposed in a space formed in the cylinder 100, a sealing member 300 disposed between an inner surface of the cylinder 100 and the piston 200, a cap 400 disposed to cover an opening at one side of the cylinder 100, a valve 500a disposed at one side of the space, and an elastic support unit which is in contact with a partition 120 of the cylinder 100 and elastically supports the valve 500a.

The elastic support unit may be provided as a leg 530a integrally formed with the valve 500a, and the leg 530a may be formed with an elastic structure which is in contact with and pressed by the partition 120 of the cylinder 100 due to movement of the piston 200. In this case, the leg 530a may be referred to as a second leg and used instead of the first leg. In addition, the valve 500a including the second leg may be referred to as a second valve.

The valve 500a may be disposed in a second space SP2.

In addition, the valve 500a may adjust a damping force of the damper 1 while moving in a first direction due to movement of the piston 200. In this case, the valve 500a may adjust the damping force of the damper 1 using a second protruding portion 520 forming a flow path changed according to an arrangement with respect to a first protruding portion 140 and the leg 530a which is the elastic support unit in contact with the partition 120.

In addition, the valve 500a may be formed of an elastic material or formed with a structure having an elastic reinforcing force.

Referring to FIGS. 20 to 24, the valve 500a may include a valve body 510 having a plate shape, the second protruding portion 520 formed to protrude from the valve body 510 so that an end portion of the first protruding portion 140 is disposed in the second protruding portion 520, the leg 530a formed to protrude from the valve body 510, and a protrusion 540 formed to protrude from an outer surface 513 of the valve body 510 in a second direction. In this case, the leg 530a may be provided as the elastic support unit. In this case, the valve body 510, the second protruding portion 520, the leg 530a, and the protrusion 540 may be integrally formed. Accordingly, the valve 500a may be provided as a single part.

The valve body 510 may include an upper surface 511, a lower surface 512, and the outer surface 513 connecting the upper surface 511 and the lower surface 512 and may be formed in a disc shape.

In addition, a plurality of ribs 511a may be formed on the upper surface 511 of the valve body 510.

The second protruding portion 520 may be formed to protrude from the lower surface 512 of the valve body 510 in the first direction. In this case, the leg 530a may be disposed apart from the second protruding portion 520.

In addition, the second protruding portion 520 may include a groove 521 formed therein. In addition, the end portion of the first protruding portion 140 may be disposed in the groove 521.

The leg 530a may be formed to protrude from the lower surface 512 of the valve body 510 toward the partition 120. In this case, based on the lower surface 512 of the valve body 510, a protruding length L2 of the leg 530a in the first direction may be greater than a protruding length L1 of the second protruding portion 520 in the first direction.

In addition, the leg 530a may be disposed on one surface of the valve body 510 to be inclined at a predetermined angle to implement an elastic support structure. Accordingly, the leg 530a may be used as the elastic support unit.

For example, the leg 530a may be formed in an arc shape. Accordingly, the leg 530a may be formed to have two fixed ends connected to the valve body 510 and may generate an elastic force greater than that of the first leg of the first valve.

In addition, the leg 530a may include a contact surface in contact with the partition 120, and the contact surface may be formed as a curved surface. Accordingly, the curved surface may be in line or point contact with a first plate portion 121.

Meanwhile, the leg 530a may be provided as a plurality of legs 530a. In addition, the plurality of legs 530a may be disposed to be rotationally symmetrical with respect to a center C of the valve body 510. Accordingly, the plurality of legs 530a may generate a constant elastic force.

The protrusion 540 may be formed to protrude from the outer surface 513 of the valve body 510 to correspond to a guide hole 150. Accordingly, the protrusion 540 may be disposed in the guide hole 150 and used as a unit which restricts a movement range of the valve 500a when the valve 500a moves.

Figure 25:
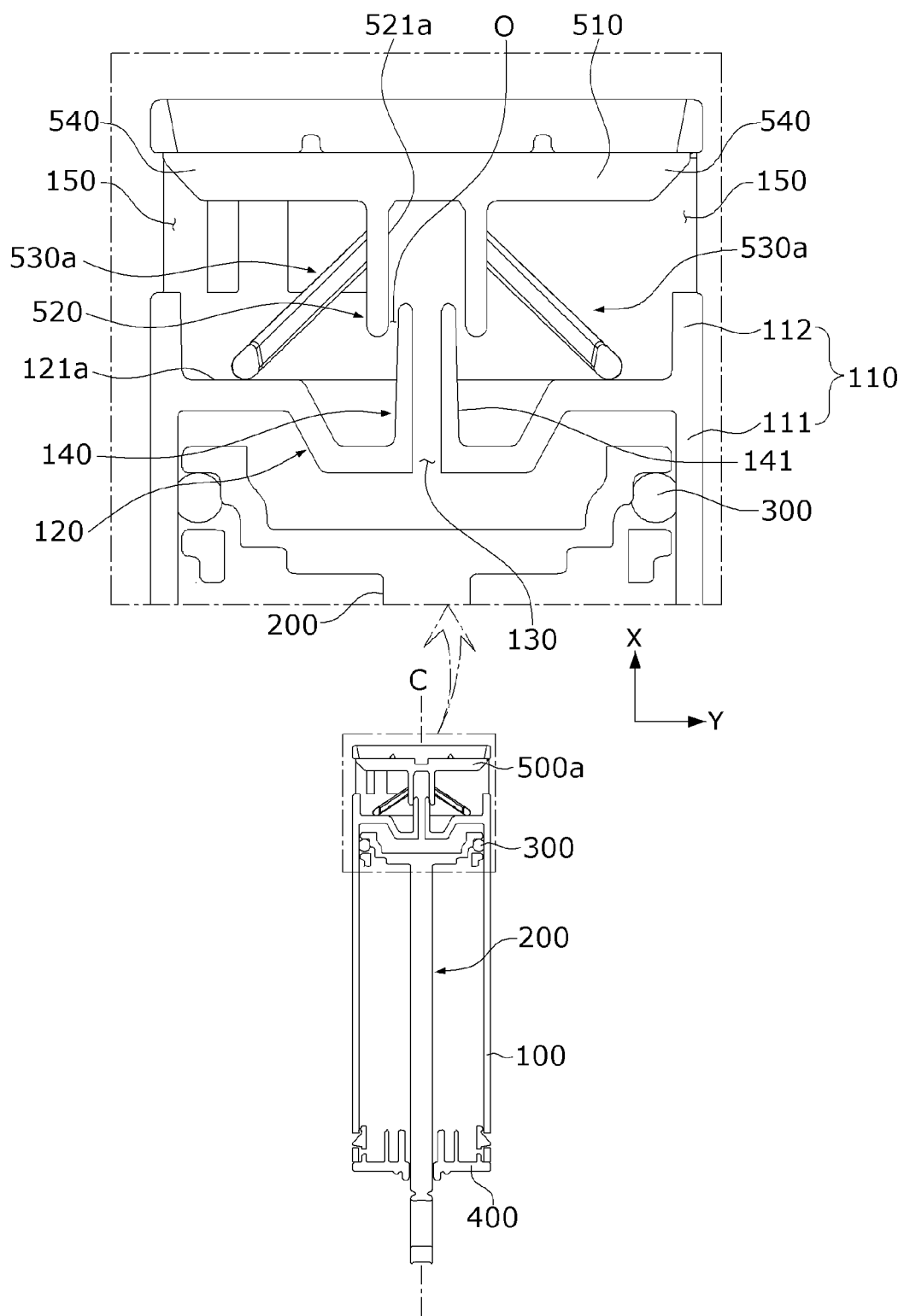
FIGS. 25 and 26 are views illustrating operation of the damper for a glove box according to the second embodiment.
Figure 26:
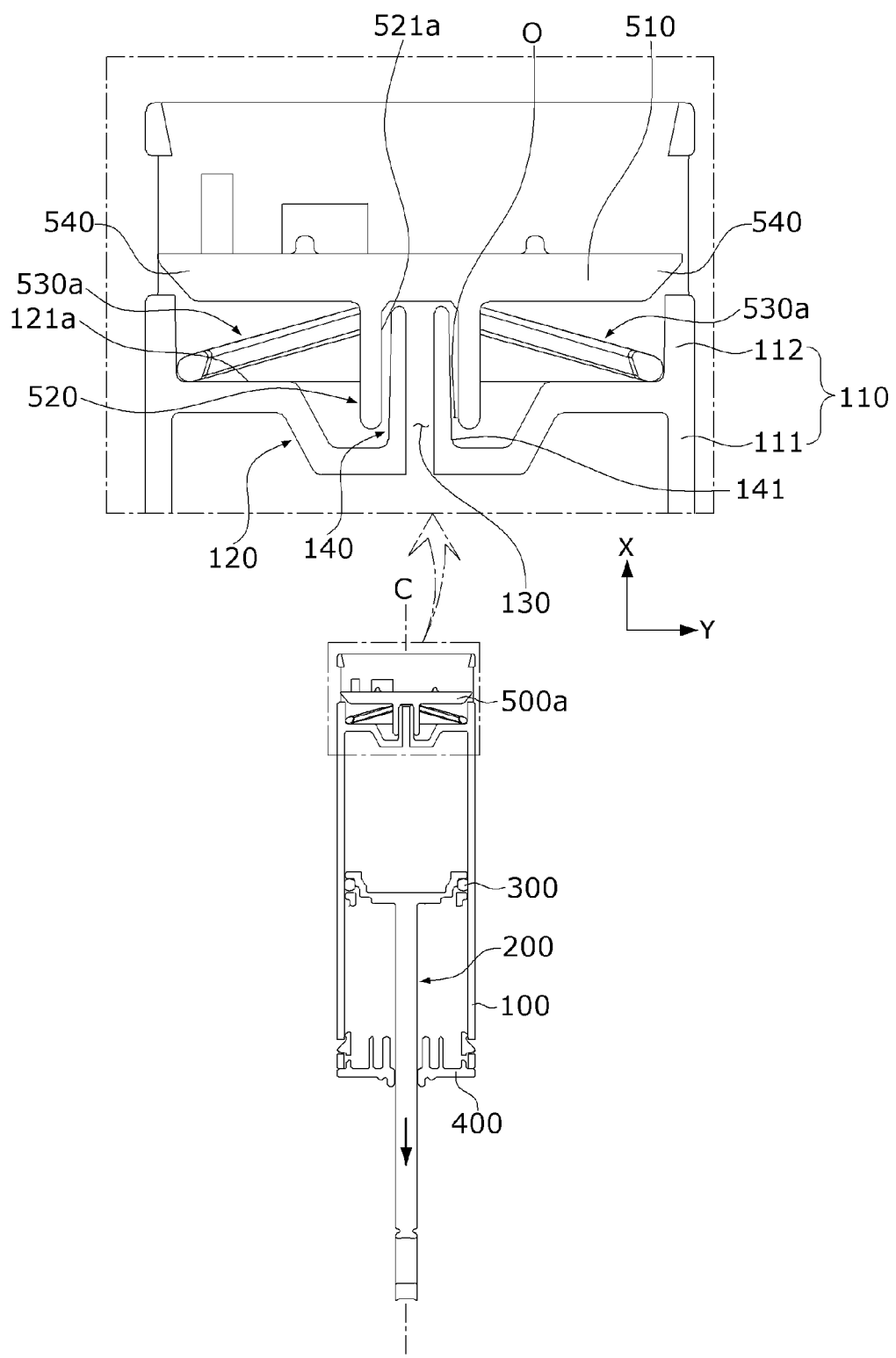

FIGS. 25 and 26 are views illustrating operation of the damper for a glove box according to the second embodiment, FIG. 25 is a view illustrating a position of the valve when the glove box is closed, and FIG. 26 is a view illustrating a position of the valve when the glove box is opened.

Referring to FIGS. 25 and 26, the valve 500a moves due to movement of the piston 200. Accordingly, while the leg 530a of the valve 500a is in contact with and pressed by an upper surface 121a of the first plate portion 121, the leg 530a is deformed. In addition, an elastic force of the leg 530a generated due to the deformation of the leg 530a may be one factor in generation of the damping force of the damper 1.

Third Embodiment

Figure 27:
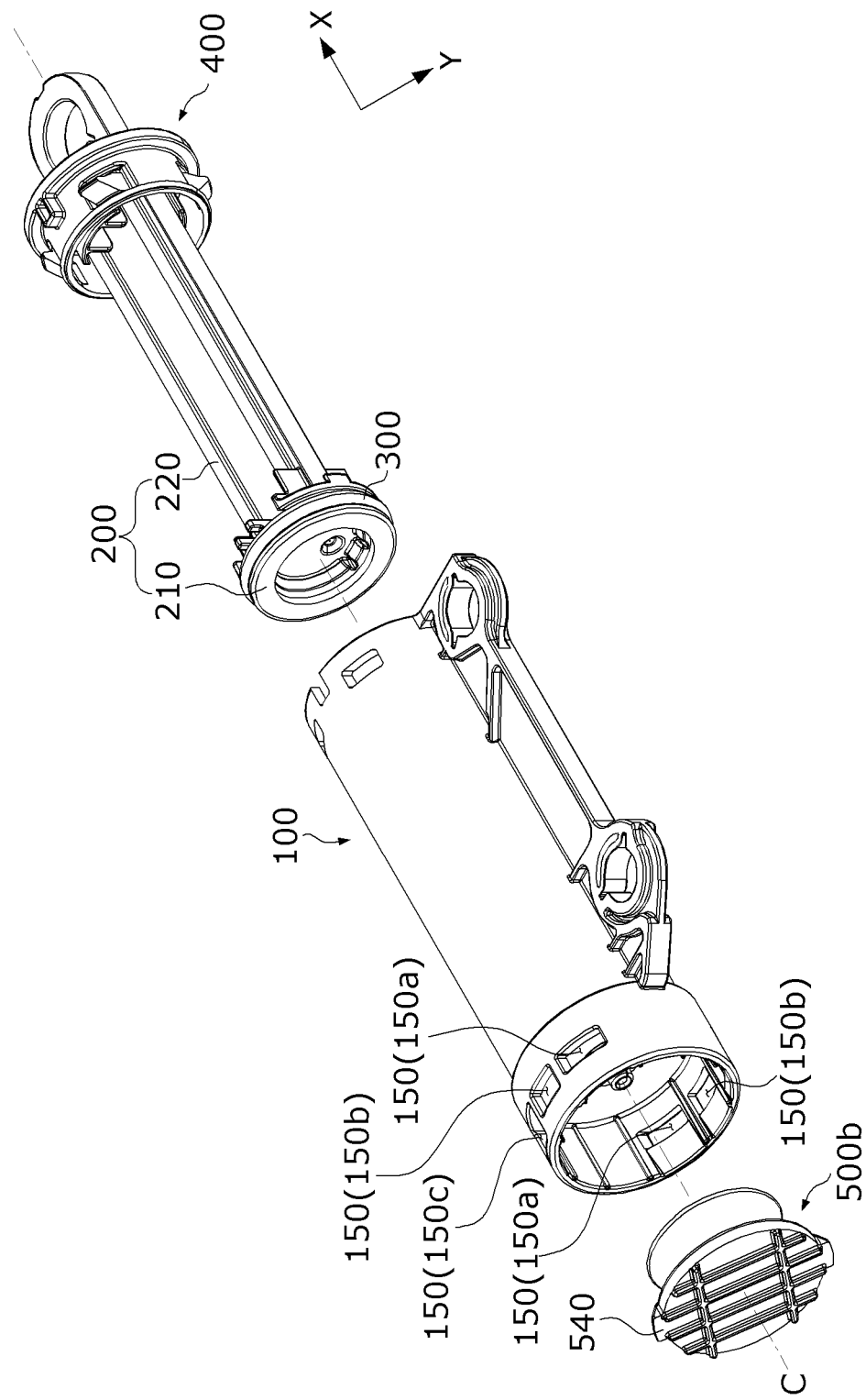
FIG. 27 is an exploded perspective view illustrating a damper for a glove box according to a third embodiment.
Figure 28:
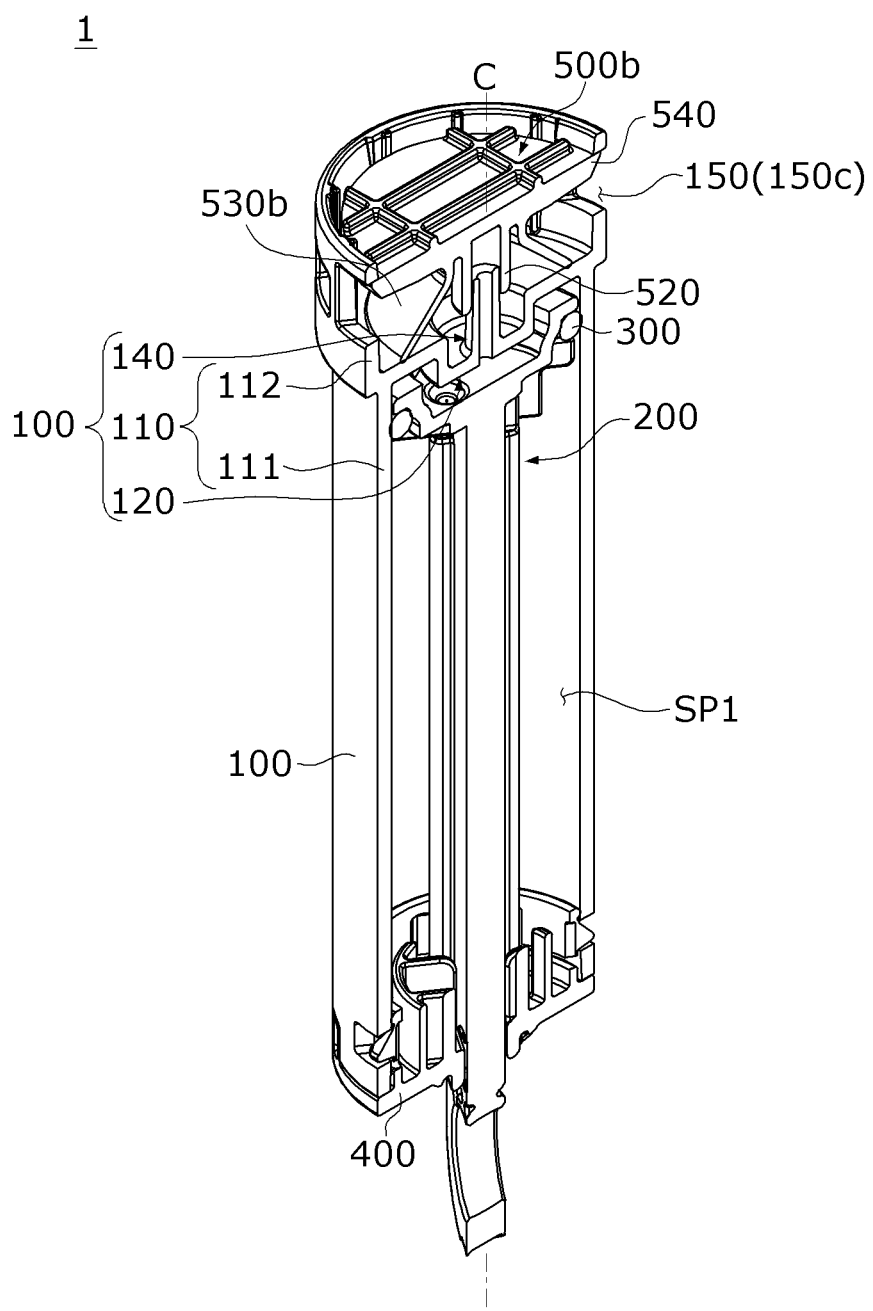
FIG. 28 is a cross-sectional perspective view illustrating the damper for a glove box according to the third embodiment.
Figure 29:
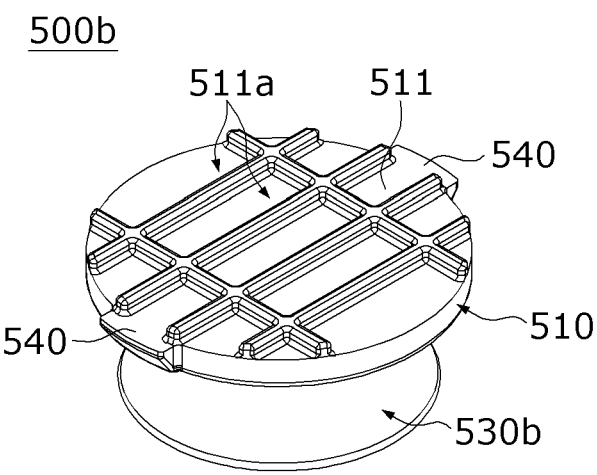
FIG. 29 is a perspective view illustrating a valve of the damper for a glove box according to the third embodiment.
Figure 30:
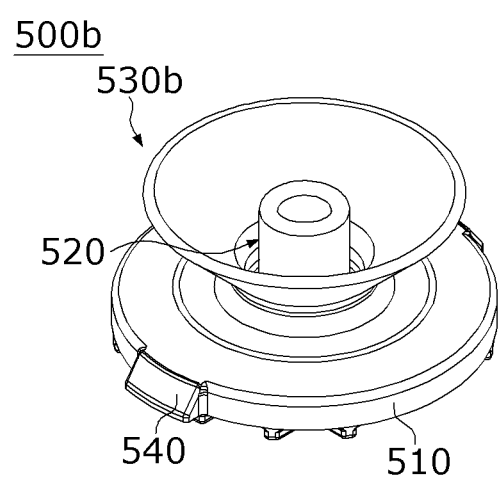
FIG. 30 is a perspective bottom view illustrating the valve of the damper for a glove box according to the third embodiment.
Figure 31:
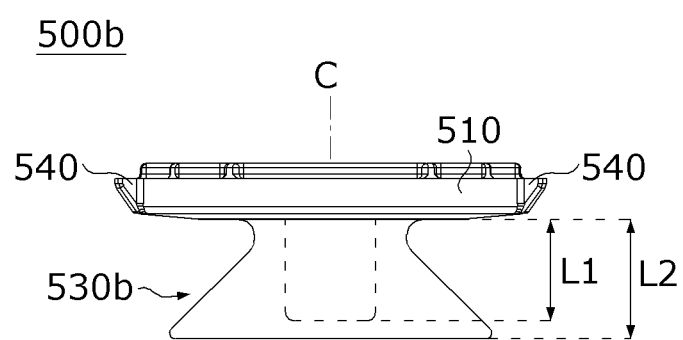
FIG. 31 is a side view illustrating the valve of the damper for a glove box according to the third embodiment.
Figure 32:
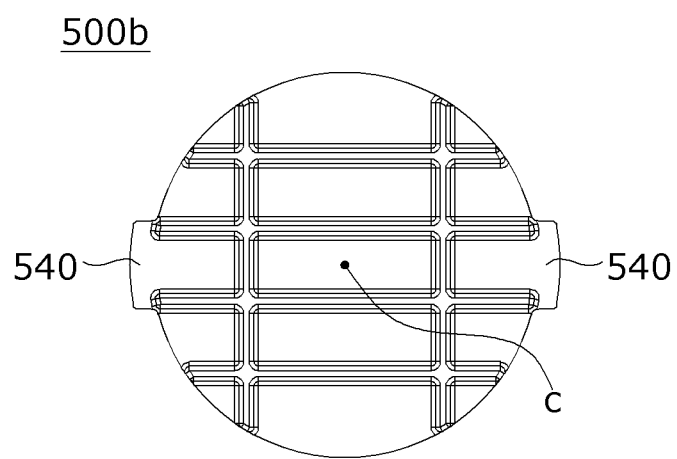
FIG. 32 is a plan view illustrating the valve of the damper for a glove box according to the third embodiment.
Figure 33:
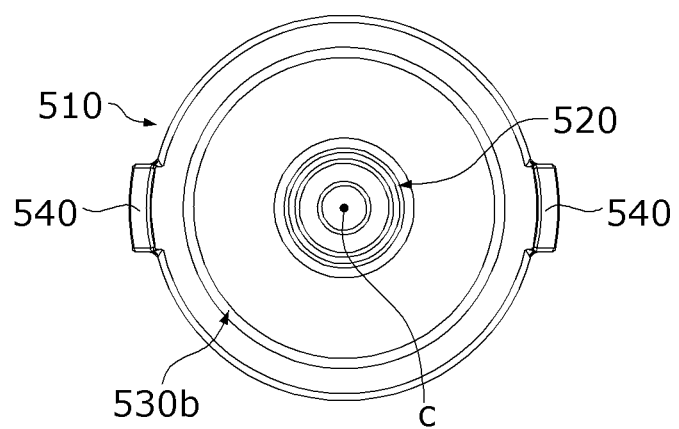
FIG. 33 is a bottom view illustrating the valve of the damper for a glove box according to the third embodiment.

FIG. 27 is an exploded perspective view illustrating a damper for a glove box according to a third embodiment, FIG. 28 is a cross-sectional perspective view illustrating the damper for a glove box according to the third embodiment, FIG. 29 is a perspective view illustrating a valve of the damper for a glove box according to the third embodiment, FIG. 30 is a perspective bottom view illustrating the valve of the damper for a glove box according to the third embodiment, FIG. 31 is a side view illustrating the valve of the damper for a glove box according to the third embodiment, FIG. 32 is a plan view illustrating the valve of the damper for a glove box according to the third embodiment, and FIG. 33 is a bottom view illustrating the valve of the damper for a glove box according to the third embodiment.

Referring to FIGS. 5 to 33, there is a difference in the shape of the valve among the damper for a glove box according to the first embodiment, the damper for a glove box according to the second embodiment, and the damper for a glove box according to the third embodiment In description of the damper for a glove box according to the third embodiment, the same reference symbols are assigned to components which are the same as those of the damper for a glove box according to the first and second embodiments, and detailed descriptions thereof will be omitted.

Referring to FIGS. 27 to 33, a damper 1 according to the third embodiment may include a cylinder 100, a piston 200 movably disposed in a space formed in the cylinder 100, a sealing member 300 disposed between an inner surface of the cylinder 100 and the piston 200, a cap 400 disposed to cover an opening at one side of the cylinder 100, a valve 500b disposed at one side of the space, and an elastic support unit which is in contact with a partition 120 of the cylinder 100 and elastically supports the valve 500b.

The elastic support unit may be provided as a leg 530b integrally formed with the valve 500b, and the leg 530b may be formed with an elastic structure which is in contact with and pressed by the partition 120 of the cylinder 100 due to movement of the piston 200. In this case, the leg 530b may be referred to as a third leg and used instead of the first and second legs. In addition, the valve 500b including the third leg may be referred to as a third valve.

The valve 500b may be disposed in a second space SP2.

In addition, the valve 500b may adjust a damping force of the damper 1 while moving in a first direction due to movement of the piston 200. In this case, the valve 500b may adjust the damping force of the damper 1 using a second protruding portion 520 forming a flow path changed according to an arrangement with respect to a first protruding portion 140 and the leg 530b which is the elastic support unit in contact with the partition 120.

In addition, the valve 500b may be formed of an elastic material or formed with a structure having an elastic reinforcing force.

Referring to FIGS. 29 to 33, the valve 500b may include a valve body 510 having a plate shape, the second protruding portion 520 formed to protrude from the valve body 510 so that an end portion of the first protruding portion 140 is disposed in the second protruding portion 520, the leg 530b formed to protrude from the valve body 510, and a protrusion 540 formed to protrude from an outer surface 513 of the valve body 510 in a second direction. In this case, the leg 530b may be provided as the elastic support unit. In this case, the valve body 510, the second protruding portion 520, the leg 530b, and the protrusion 540 may be integrally formed. Accordingly, the valve 500b may be provided as a single part.

The valve body 510 may include an upper surface 511, a lower surface 512, and the outer surface 513 connecting the upper surface 511 and the lower surface 512 and may be formed in a disc shape.

In addition, a plurality of ribs 511a may be formed on the upper surface 511 of the valve body 510.

The second protruding portion 520 may be formed to protrude from the lower surface 512 of the valve body 510 in the first direction. In this case, the leg 530b may be disposed apart from the second protruding portion 520.

In addition, the second protruding portion 520 may include a groove 521 formed therein. In addition, the end portion of the first protruding portion 140 may be disposed in the groove 521.

The leg 530b may be formed to protrude from the lower surface 512 of the valve body 510 toward the partition 120. In this case, based on the lower surface 512 of the valve body 510, a protruding length L2 of the leg 530b in the first direction may be greater than a protruding length L1 of the second protruding portion 520 in the first direction.

In addition, the leg 530b may be obliquely disposed on one surface of the valve body 510 at a predetermined angle to implement an elastic support structure. Accordingly, the leg 530b may be used as the elastic support unit.

For example, the leg 530b may be formed in a tapered shape. In addition, the leg 530b may be formed to have a cross section having a ring shape. Accordingly, the leg 530b may be formed to have a fixed end having a ring shape connected to the valve body 510 and generate an elastic force greater than that of the second leg of the second valve. In this case, the leg 530b may generate the elastic force which is more uniform than that of the second leg of the second valve.

In addition, the leg 530b may include a contact surface in contact with the partition 120, and the contact surface may be formed as a curved surface. Accordingly, the curved surface may be in line or point contact with a first plate portion 121.

The protrusion 540 may be formed to protrude from the outer surface 513 of the valve body 510 to correspond to a guide hole 150. Accordingly, the protrusion 540 may be disposed in the guide hole 150 and used as a unit which restricts a movement range of the valve 500b when the valve 500b moves.

Figure 34:
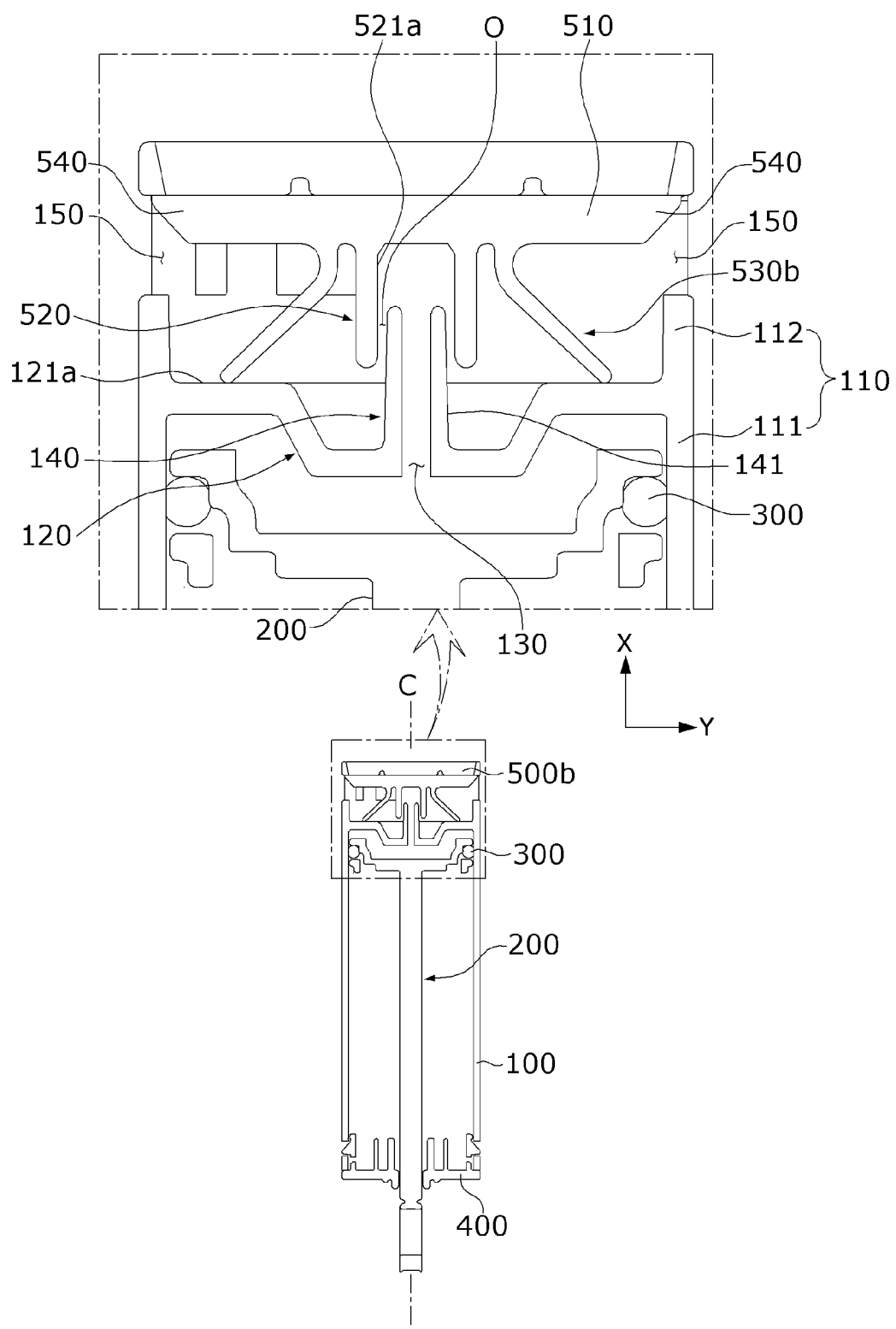
FIGS. 34 and 35 are views illustrating operation of the damper for a glove box according to the third embodiment.
Figure 35:
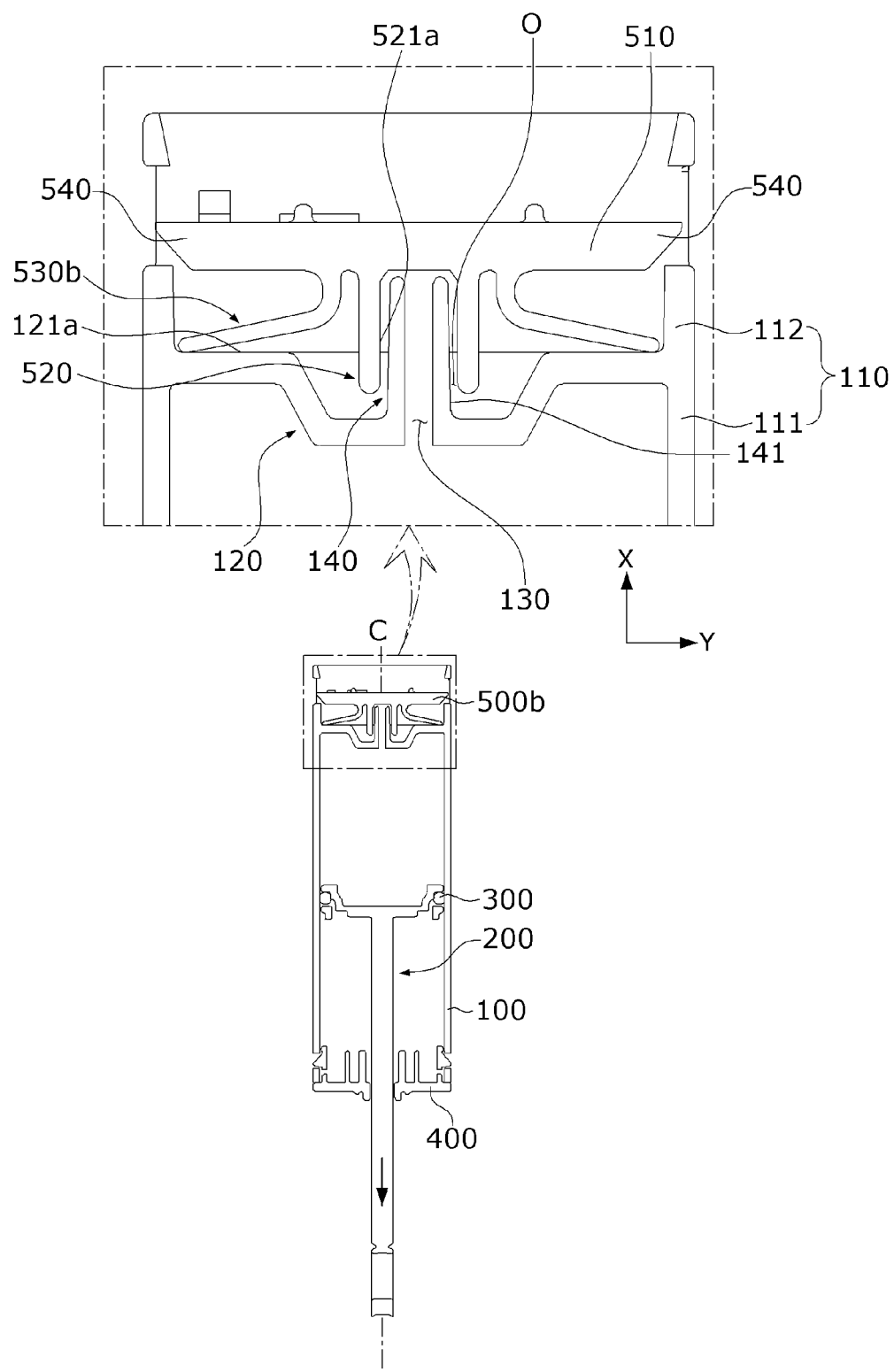

FIGS. 34 and 35 are views illustrating operation of the damper for a glove box according to the third embodiment, FIG. 34 is a view illustrating a position of the valve when the glove box is closed, and FIG. 35 is a view illustrating a position of the valve when the glove box is opened.

Referring to FIGS. 34 and 35, the valve 500b moves due to movement of the piston 200. Accordingly, while the leg 530b of the valve 500b is in contact with and pressed by an upper surface 121a of the first plate portion 121, the leg 530b is deformed. Specifically, the leg 530b may be deformed so that an end portion thereof widens away from a center C. In addition, an elastic force of the leg 530b generated according to the deformation may be one factor in generation of the damping force of the damper 1.

Fourth Embodiment

Figure 36:
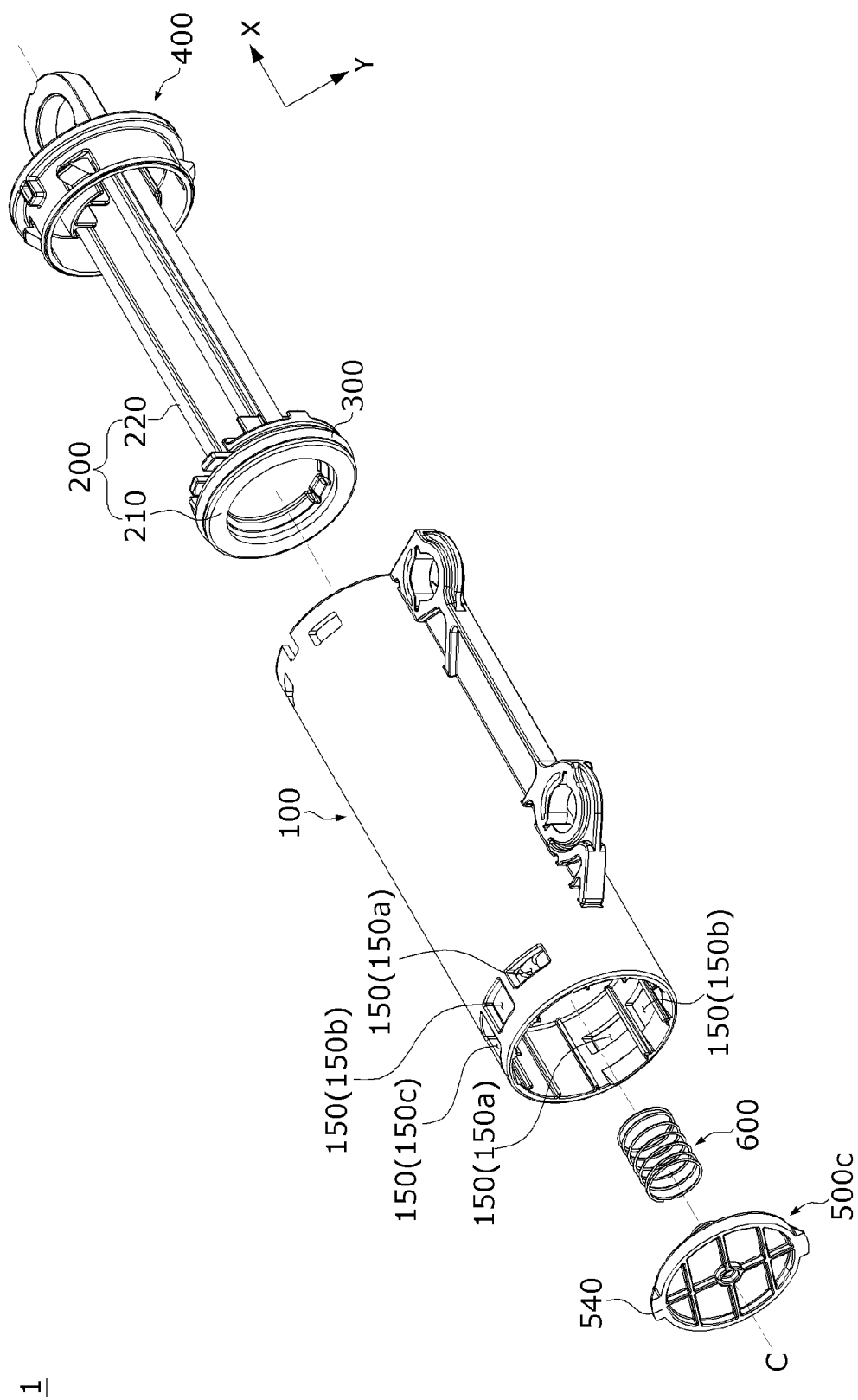
FIG. 36 is an exploded perspective view illustrating a damper for a glove box according to a fourth embodiment.
Figure 37:
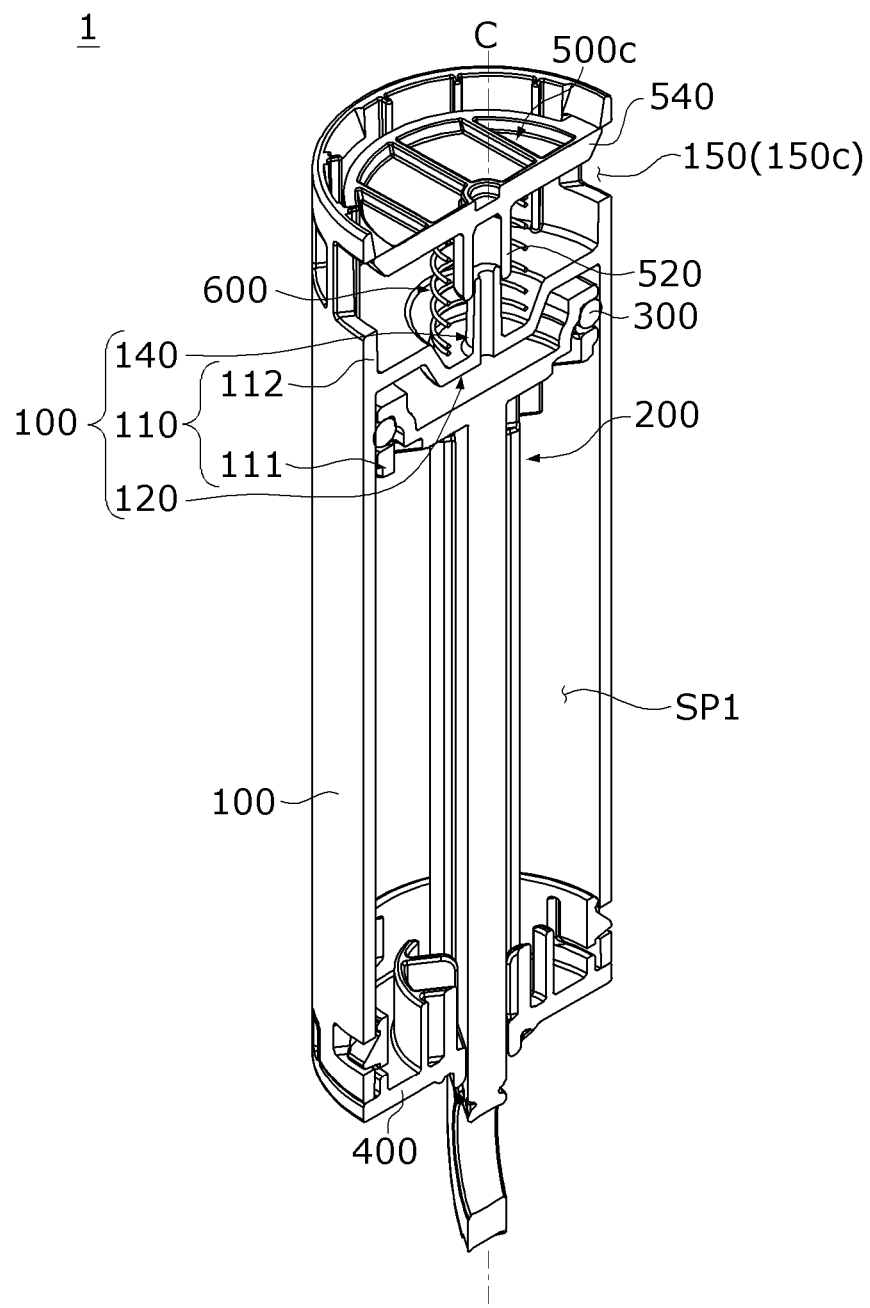
FIG. 37 is a cross-sectional perspective view illustrating the damper for a glove box according to the fourth embodiment.
Figure 38:
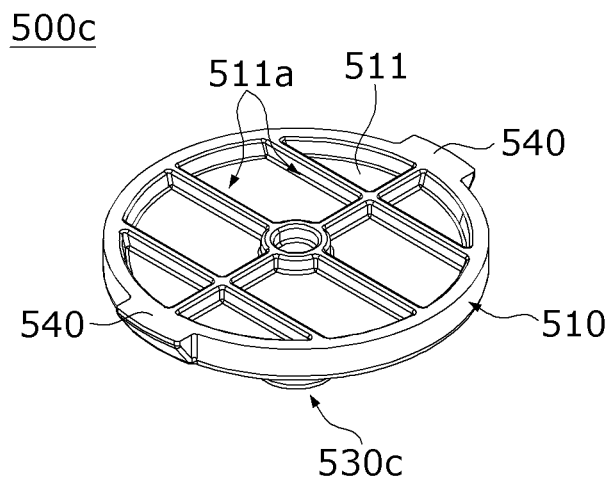
FIG. 38 is a perspective view illustrating the valve of the damper for a glove box according to the fourth embodiment.
Figure 39:
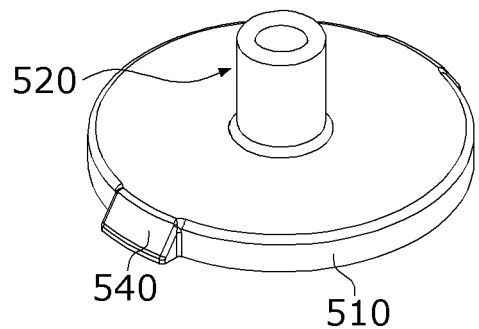
FIG. 39 is a perspective bottom view illustrating the valve of the damper for a glove box according to the fourth embodiment.
Figure 40:
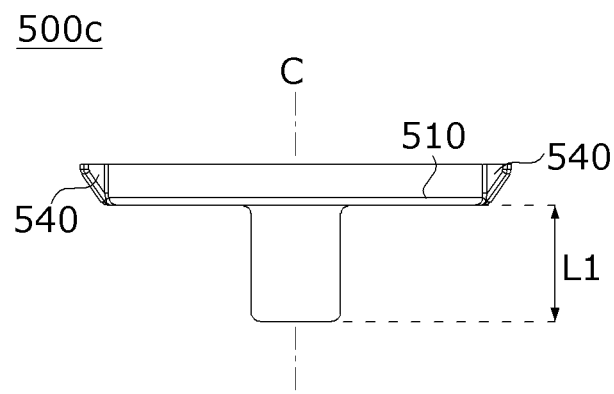
FIG. 40 is a side view illustrating the valve of the damper for a glove box according to the fourth embodiment.
Figure 41:
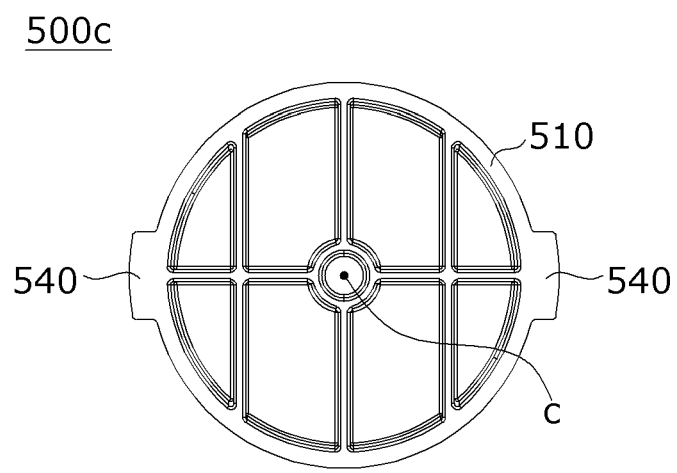
FIG. 41 is a plan view illustrating the valve of the damper for a glove box according to the fourth embodiment.
Figure 42:
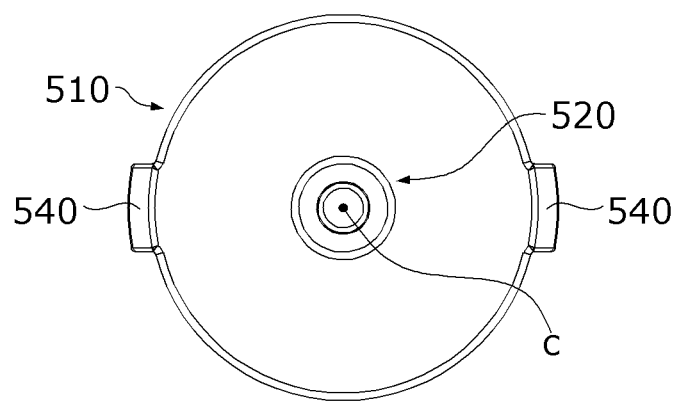
FIG. 42 is a bottom view illustrating the valve of the damper for a glove box according to the fourth embodiment.

FIG. 36 is an exploded perspective view illustrating a damper for a glove box according to a fourth embodiment, FIG. 37 is a cross-sectional perspective view illustrating the damper for a glove box according to the fourth embodiment, FIG. 38 is a perspective view illustrating the valve of the damper for a glove box according to the fourth embodiment, FIG. 39 is a perspective bottom view illustrating the valve of the damper for a glove box according to the fourth embodiment, FIG. 40 is a side view illustrating the valve of the damper for a glove box according to the fourth embodiment, FIG. 41 is a plan view illustrating the valve of the damper for a glove box according to the fourth embodiment, and FIG. 42 is a bottom view illustrating the valve of the damper for a glove box according to the fourth embodiment.

Referring to FIGS. 5 to 36, there are differences in the shape of the valve and in that a spring is provided as an elastic support unit among the damper for a glove box according to the first embodiment, the damper for a glove box according to the second embodiment, the damper for a glove box according to the third embodiment, and the damper for a glove box according to the fourth embodiment.

In description of the damper for a glove box according to the fourth embodiment, the same reference symbols are assigned to components which are the same as those of the damper for a glove box according to the first to third embodiments, and detailed descriptions thereof will be omitted.

Referring to FIGS. 36 to 42, a damper 1 according to the fourth embodiment may include a cylinder 100, a piston 200 movably disposed in a space formed in the cylinder 100, a sealing member 300 disposed between an inner surface of the cylinder 100 and the piston 200, a cap 400 disposed to cover an opening at one side of the cylinder 100, a valve 500c disposed at the other side of the space, and an elastic support unit which is in contact with a partition 120 of the cylinder 100 and elastically supports the valve 500c.

The elastic support unit may be an elastic support member 600 provided separately from the valve 500c.

The elastic support member 600 may be a member which is in contact with and compressed by the partition 120 of the cylinder 100 due to movement of the piston 200.

The valve 500c may be disposed in a second space SP2. In this case, the valve 500c may be referred to as a fourth valve. In addition, there is difference in that the fourth valve is a member in which a leg is omitted unlike the first to third valves.

In addition, since the valve 500c is elastically supported by the elastic support member 600 while moving in a first direction due to movement of the piston 200, along with the elastic support member 600, the valve 500c may adjust a damping force of the damper 1. In this case, the valve 500c may adjust the damping force of the damper 1 using a second protruding portion 520 forming a flow path changed according to an arrangement with respect to a first protruding portion 140 and the elastic support member 600 of which one side is in contact with the partition 120 and the other side is in contact with the valve 500c.

In addition, the valve 500c may be formed of an elastic material or formed with a structure having an elastic reinforcing force.

Referring to FIGS. 38 to 42, the valve 500c may include a valve body 510 having a plate shape, the second protruding portion 520 formed to protrude from the valve body 510 so that an end portion of the first protruding portion 140 is disposed in the second protruding portion 520, and a protrusion 540 formed to protrude from an outer surface 513 of the valve body 510 in a second direction. In this case, the valve body 510, the second protruding portion 520, and the protrusion 540 may be integrally formed. Accordingly, the valve 500c may be provided as a single part.

The valve body 510 may include an upper surface 511, a lower surface 512, and the outer surface 513 connecting the upper surface 511 and the lower surface 512 and may be formed in a disc shape.

In addition, a plurality of ribs 511a may be formed on the upper surface 511 of the valve body 510.

The second protruding portion 520 may be formed to protrude from the lower surface 512 of the valve body 510 in the first direction. In this case, the elastic support member 600 may be disposed apart from the second protruding portion 520.

In addition, the second protruding portion 520 may include a groove 521 formed therein. In addition, the end portion of the first protruding portion 140 may be disposed in the groove 521.

The protrusion 540 may be formed to protrude from the outer surface 513 of the valve body 510 to correspond to a guide hole 150. Accordingly, the protrusion 540 may be disposed in the guide hole 150 and used as a unit which restricts a movement range of the valve 500c when the valve 500c moves.

The elastic support member 600 may be a member which is pressed due to movement of the valve 500c to generate an elastic force. For example, the elastic support member 600 may be provided as a coil spring.

The spring may be in contact with the lower surface 512 of the valve body 510, and the other side may be in contact with an upper surface 122a of a second plate portion 122. In addition, since the valve 500c moves in the first direction, the spring may be compressed. In this case, even when the spring is compressed, a length of the compressed spring may be greater than a protruding length L1 of the second protruding portion 520 in the first direction.

In addition, the spring may be disposed outside the second protruding portion 520.

Figure 43:
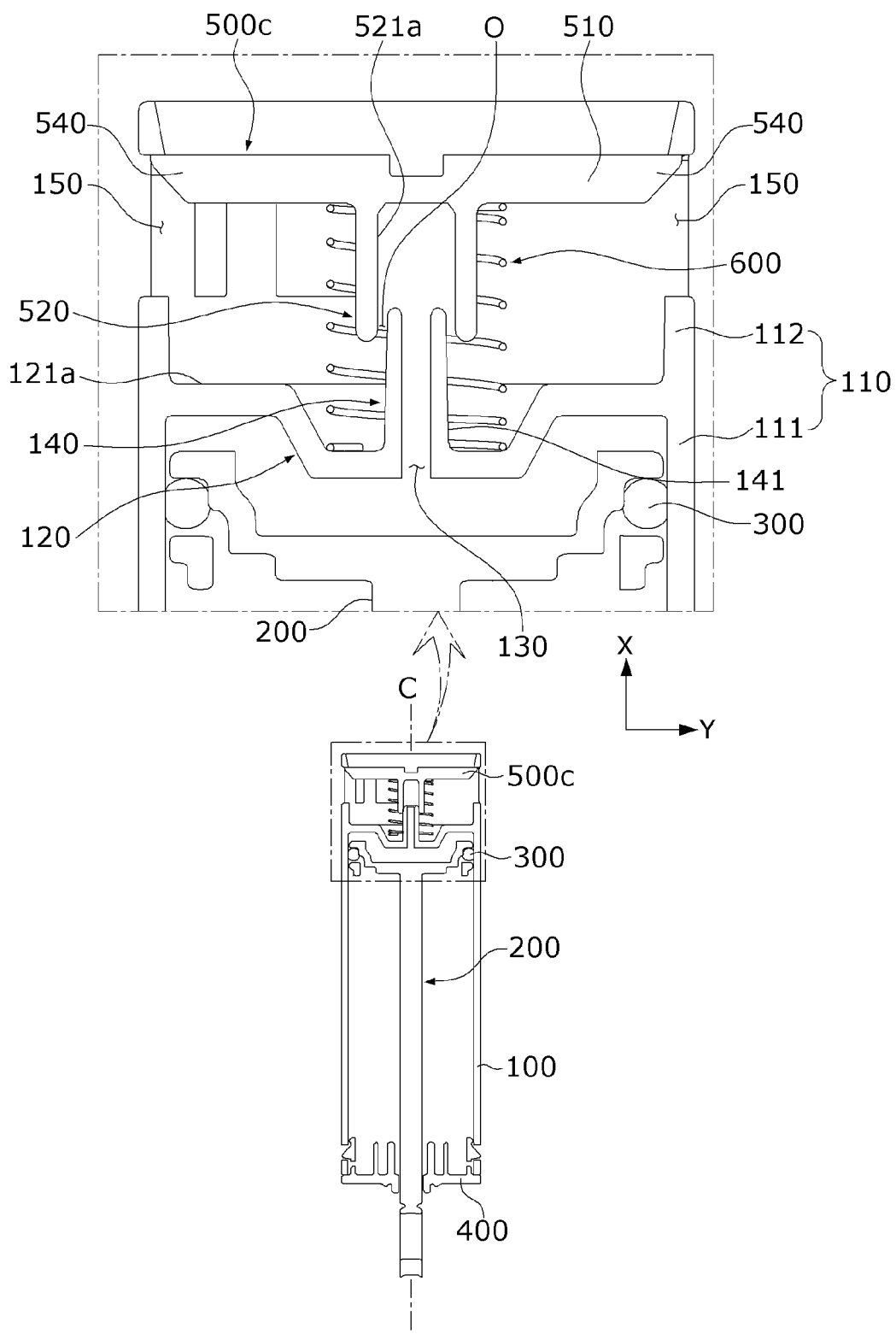
FIGS. 43 and 44 are views illustrating operation of the damper for a glove box according to the fourth embodiment.
Figure 44:
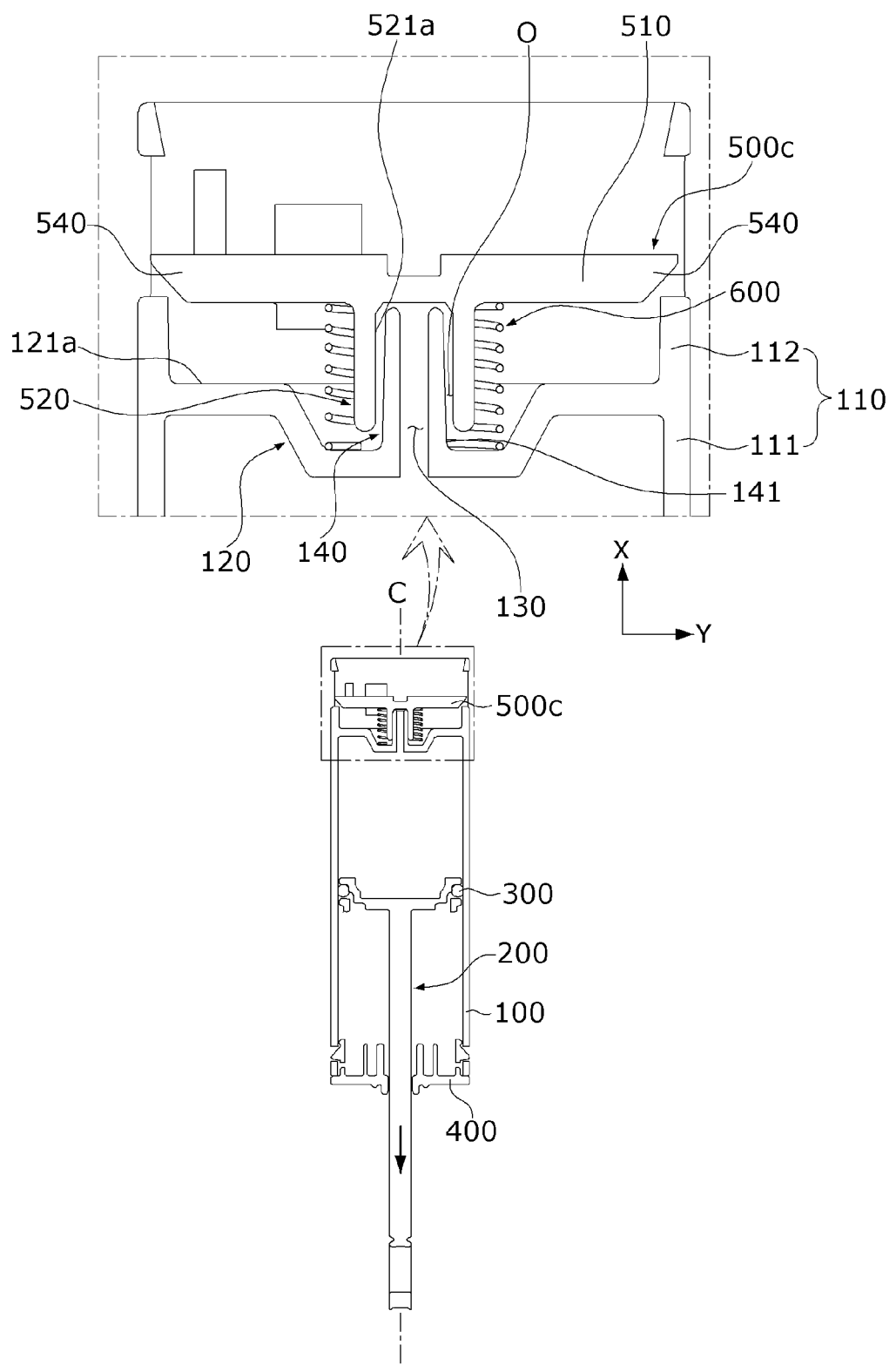

FIGS. 43 and 44 are views illustrating operation of the damper for a glove box according to the fourth embodiment, wherein FIG. 43 is a view illustrating a position of the valve when the glove box is closed, and FIG. 44 is a view illustrating a position of the valve when the glove box is opened.

Referring to FIGS. 43 and 44, the valve 500c moves due to movement of the piston 200. Accordingly, the elastic support member 600 is compressed while in contact with and pressed by the upper surface 122a of the second plate portion 122. In addition, an elastic force of the elastic support member 600 generated according to the compression is one factor in generation of the damping force of the damper 1.

According to embodiments, movement of a cover can be controlled at a constant speed regardless of a load applied to the cover of a glove box using a damper for a glove box. Accordingly, the cover can smoothly and stably open the glove box.

Various useful advantages and effects of the present invention are not limited to the above-described content and may be more easily understood from description of specific embodiments of the present invention.

While the present invention has been described above with reference to exemplary embodiments, it may be understood by those skilled in the art that various modifications and changes of the present invention may be made within a range not departing from the spirit and scope of the present invention defined by the appended claims. In addition, it should be interpreted that differences related to modifications and changes fall within the scope of the present invention defined by the appended claims.

What is claimed is:

1. A damper for a glove box, comprising:
a cylinder including a cylinder body that defines a space therein, a partition that divides the space into a first space and a second space, and a first protruding portion protruding from the partition so that a hole formed in the partition is extended;
a piston disposed in the first space and configured to be movable in a first direction;
a valve disposed in the second space; and
an elastic support unit disposed in the second space to elastically support the valve,
wherein the elastic support unit is in contact with and pressed by the partition due to movement of the piston, and
wherein the valve includes:
a valve body; and
a second protruding portion protruding from the valve body so that an end portion of the first protruding portion is disposed in the second protruding portion.

2. The damper of claim 1, wherein the valve includes:
a leg protruding from the valve body,
wherein the leg is the elastic support unit, and
the valve body and the leg are integral.

3. The damper of claim 2, wherein
the leg includes a plurality of legs, and
the legs are rotationally symmetrical with respect a center of the valve body.

4. The damper of claim 2, wherein the leg is disposed on one surface of the valve body and inclined at a predetermined angle.

5. The damper of claim 4, wherein the leg is bar-shaped.

6. The damper of claim 5, wherein
the leg includes a first region obliquely disposed on the valve body and a second region obliquely disposed from an end portion of the first region, and
the second region overlaps the first region in the first direction.

7. The damper of claim 4, wherein the leg is arc-shaped.

8. The damper of claim 4, wherein the leg is tapered-shaped and has a cross section having a ring shape.

9. The damper of claim 4, wherein, based on the one surface of the valve body, a length of the leg in the first direction is greater than a length of the second protruding portion in the first direction.

10. A damper for a glove box, comprising:
a cylinder including a cylinder body that defines a space therein, a partition that divides the space into a first space and a second space, and a first protruding portion protruding from the partition so that a hole formed in the partition is extended;
a piston disposed in the first space and configured to be movable in a first direction;
a valve disposed in the second space; and
an elastic support unit disposed in the second space to elastically support the valve,
wherein the elastic support unit is in contact with and pressed by the partition due to movement of the piston,
wherein the valve includes a valve body having a plate shape and a second protruding portion protruding from the valve body so that an end portion of the first protruding portion is disposed in the second protruding portion, and
wherein the elastic support unit comprises a coil spring having one side in contact with the valve body and another side in contact with the partition.

11. The damper of claim 10, wherein the partition includes:
a first plate portion;
a second plate portion disposed apart from the first plate portion in the first direction; and
a connection part connecting the first plate portion to the second plate portion,
wherein the hole is disposed in the second plate portion, and
the one side of the spring is in contact with the second plate portion.

12. The damper of claim 2, wherein
an orifice is disposed between an outer surface of the first protruding portion and an inner surface of the second protruding portion, and
a size of the orifice changes according to movement of the second protruding portion.

13. The damper of claim 12, wherein the outer surface of the first protruding portion is an inclined surface having a predetermined inclination.

14. The damper of claim 2, wherein
the valve includes a protrusion protruding from an outer surface of the valve body,
the cylinder body includes a first guide hole and a second guide hole having different sizes in the first direction, and
the protrusion is disposed in one of the first guide hole and the second guide hole.

15. The damper of claim 14, wherein
a size of the second guide hole in the first direction is greater than a size of the first guide hole in the first direction, and
a separation distance from the partition to the first guide hole is equal to a separation distance from the partition to the second guide hole.

16. The damper of claim 15, wherein
the cylinder body includes a third guide hole,
a size of the third guide hole in the first direction is greater than the size of the second guide hole in the first direction, and
a separation distance from the partition to the third guide hole is equal to the separation distance from the partition to the second guide hole.

17. The damper of claim 1, wherein a cross-sectional area of the cylinder decreases from one end toward the other end of the cylinder.

18. A glove box comprising:
a glove box body in which form a storage space is formed and a cover; and
the damper for a glove box of claim 1,
wherein the glove box body is rotatably disposed in a dashboard of a vehicle, and
the damper for a glove box adjusts a movement speed of the glove box body.

19. A damper for a glove box, comprising:
a cylinder including a cylinder body that defines a space therein, a partition that divides the space into a first space and a second space, a first protruding portion protruding from the partition so that a hole formed in the partition is extended, and a plurality of guide holes disposed in the cylinder body to expose the second space;
a piston formed in the first space and configured to be movable in a first direction; and
a valve disposed in the second space,
wherein the valve includes a valve body having a plate shape, a second protruding portion protruding from the valve body so that an end portion of the first protruding portion is disposed in the second protruding portion, a leg protruding from the valve body toward the partition, and a protrusion protruding from an outer surface of the valve body,
the guide holes include a first guide hole and a second guide hole having different sizes in the first direction, and
the protrusion is disposed in one of the first guide hole and the second guide hole.

20. The damper of claim 19, wherein
a size of the second guide hole in the first direction is greater than a size of the first guide hole in the first direction, and
a separation distance from the partition to the first guide hole is equal to a separation distance from the partition to the second guide hole.

* * * * *